US009178677B2

(12) United States Patent
Han et al.

(10) Patent No.: US 9,178,677 B2
(45) Date of Patent: Nov. 3, 2015

(54) METHOD AND APPARATUS FOR TRANSMITTING UPLINK CONTROL INFORMATION IN A WIRELESS COMMUNICATION SYSTEM

(75) Inventors: Seung Hee Han, Anyang-si (KR); Yeong Hyeon Kwon, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 13/575,940

(22) PCT Filed: Jan. 27, 2011

(86) PCT No.: PCT/KR2011/000566
§ 371 (c)(1),
(2), (4) Date: Sep. 13, 2012

(87) PCT Pub. No.: WO2011/093651
PCT Pub. Date: Aug. 4, 2011

(65) Prior Publication Data
US 2012/0327875 A1    Dec. 27, 2012

Related U.S. Application Data

(60) Provisional application No. 61/298,918, filed on Jan. 28, 2010, provisional application No. 61/348,696, filed on May 26, 2010, provisional application No. 61/360,424, filed on Jun. 30, 2010, provisional application No. 61/362,695, filed on Jul. 9, 2010.

(30) Foreign Application Priority Data
Jan. 26, 2011    (KR) .................. 10-2011-0007669

(51) Int. Cl.
*H04W 72/04*    (2009.01)
*H04L 5/00*    (2006.01)
(Continued)

(52) U.S. Cl.
CPC ............ *H04L 5/0053* (2013.01); *H04L 1/0031* (2013.01); *H04L 1/0073* (2013.01);
(Continued)

(58) Field of Classification Search
None
See application file for complete search history.

(56) References Cited

U.S. PATENT DOCUMENTS

| | | | |
|---|---|---|---|
| 2005/0265227 A1 | 12/2005 | Byun et al. | |
| 2008/0298488 A1 | 12/2008 | Shen et al. | |
| 2009/0175159 A1 | 7/2009 | Bertrand et al. | |
| 2011/0243066 A1* | 10/2011 | Nazar et al. | 370/328 |

FOREIGN PATENT DOCUMENTS

| | | |
|---|---|---|
| CN | 101502034 A | 8/2009 |
| CN | 101534548 A | 9/2009 |
| CN | 101617489 A | 12/2009 |

OTHER PUBLICATIONS

G. Claire et al., "Bit-interleaved coded modulation," IEEE Transactions on Information Theory, vol. 44, No. 3, pp. 927-946, May 1998.
(Continued)

*Primary Examiner* — Rhonda Muphy
(74) *Attorney, Agent, or Firm* — Dentons US LLP

(57) ABSTRACT

The present invention provides a method and apparatus for transmitting uplink control information (UCI) with user equipment in a wireless communication system. The user equipment performs channel coding on information bits of UCI to generate encoded information bits; modulates the generated encoded information bits to generate complex modulation symbols; spreads the complex modulation symbols blockwise into a plurality of single carrier frequency division multiple access (SC-FDMA) symbols on the basis of an orthogonal sequence; and transmits the spread complex modulation symbols to a base station.

15 Claims, 29 Drawing Sheets

(51) Int. Cl.
*H04L 1/00* (2006.01)
*H04W 28/04* (2009.01)
*H04L 1/18* (2006.01)

(52) U.S. Cl.
CPC ............ *H04L5/0007* (2013.01); *H04L 5/0055* (2013.01); *H04L 5/0057* (2013.01); *H04L 1/1861* (2013.01); *H04W 28/04* (2013.01)

(56) References Cited

OTHER PUBLICATIONS

M. Noune, et al., "Frequency-domain precoding for single carrier frequency-division multiple access," IEEE Communications Magazine, pp. 68-74, Jun. 2009.
H.G. Myung, "Single Carrier FDMA," pp. 18-20, May 18, 2008.

* cited by examiner

FIG. 5
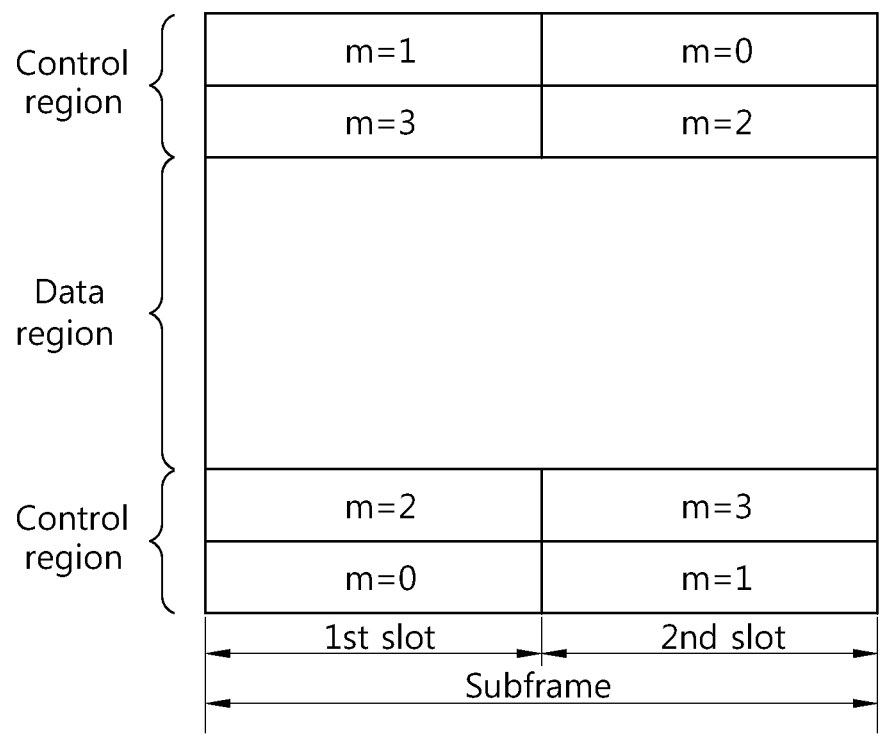
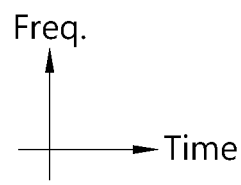

FIG. 8
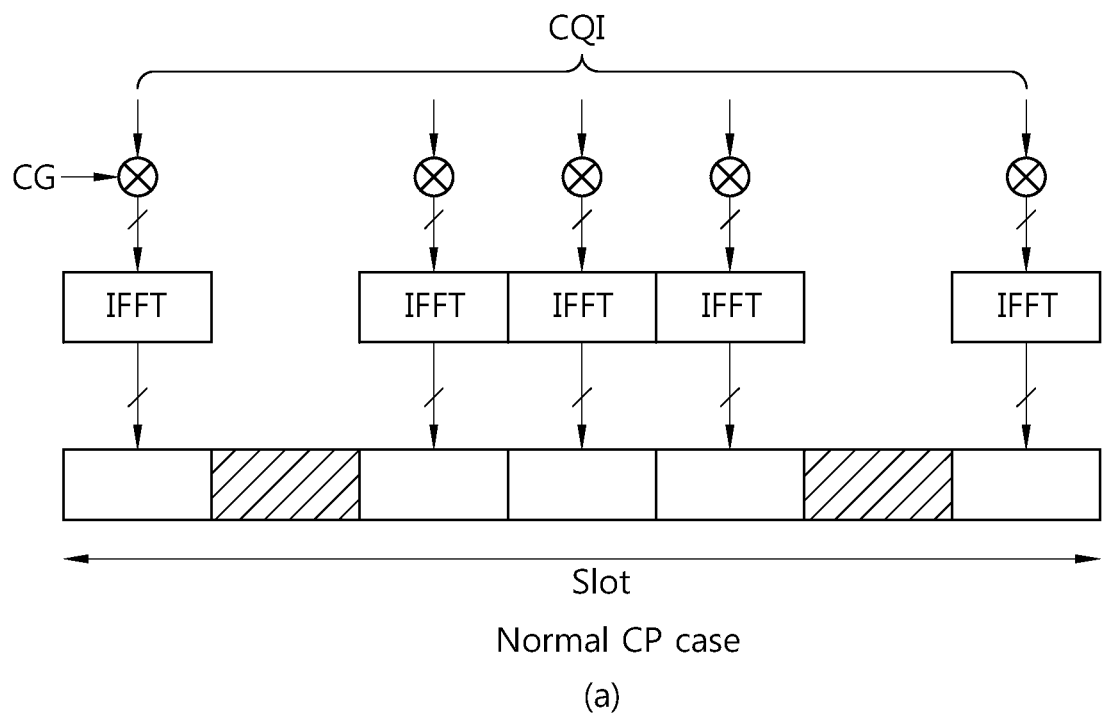
Slot
Normal CP case
(a)
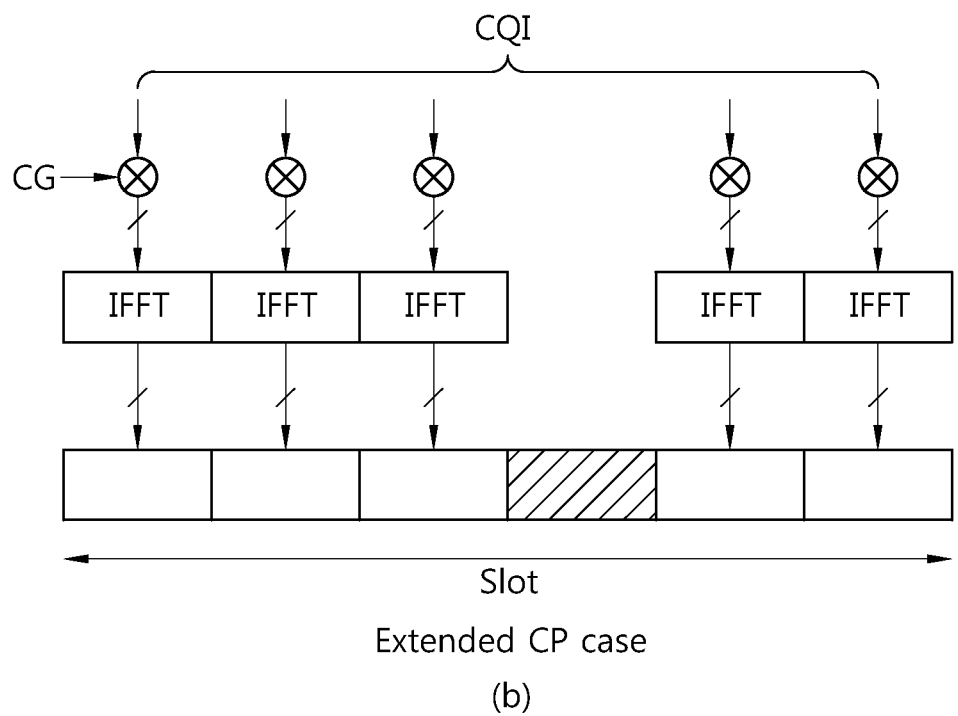
Slot
Extended CP case
(b)

FIG. 10
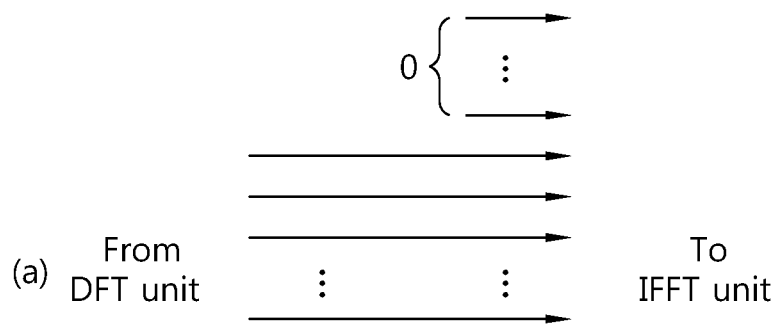
(a) From DFT unit → To IFFT unit
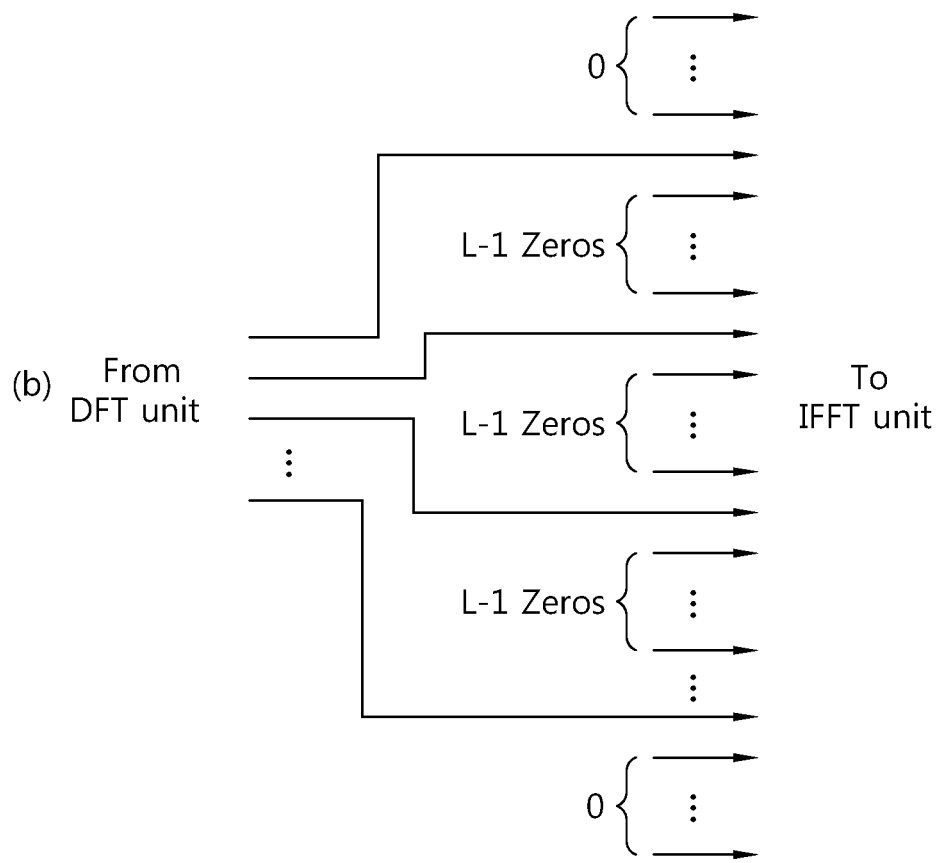
(b) From DFT unit → To IFFT unit

METHOD AND APPARATUS FOR TRANSMITTING UPLINK CONTROL INFORMATION IN A WIRELESS COMMUNICATION SYSTEM

This Application is a 35 U.S.C. §371 National Stage Entry of International Application No. PCT/KR2011/000566, filed Jan. 27, 2011 and claims the benefit of U.S. Provisional Application Nos. 61/298,918, filed Jan. 28, 2010, 61/348,696, filed May 26, 2010, 61/360,424, filed Jun. 30, 2010, 61/362,695, filed Jul. 9, 2010, and Korean Application No: 10-2011-0007669, filed Jan. 26, 2011, all of which are incorporated by reference in their entirety herein.

BACKGROUND OF THE INVENTION

1. Field of the Invention

The present invention relates to wireless communication, and specifically, the present invention relates to a method and an apparatus for transmitting uplink control information by a user equipment in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

Uplink control information (UCI) can be transmitted through a physical uplink control channel (PUCCH). The UCI can include various types of information such as a scheduling request (SR), an acknowledgement/non-acknowledgement (ACK/NACK) signal for hybrid ARQ (HARQ), a channel quality indicator (CQI), a precoding matrix indicator (PMI), a rank indicator (RI), etc. The PUCCH carries various types of control information according to a format.

There is a need for a method for effectively transmitting various types of UCI.

SUMMARY OF THE INVENTION

The present invention provides a method and an apparatus for transmitting uplink control information by a user equipment in a wireless communication system.

In an aspect, a method for transmitting uplink control information (UCI) by a user equipment in a wireless communication system is provided. The method includes performing channel coding on information bits of the UCI to generate encoding information bits, modulating the generated encoding information bits to generate complex modulation symbols, block-wise spreading the complex modulation symbols to multiple single carrier-frequency division multiple access (SC-FDMA) symbols on the basis of an orthogonal sequence, and transmitting the spread complex modulation symbols to a base station.

The information bits of the UCI may include concatenation of a hybrid automatic repeat request (HARQ)-acknowledgement (ACK) information bit for each cell.

The HARQ-ACK information bit for each cell may be determined based on a transmission mode of each cell.

If the transmission mode of each cell is a single codeword transmission mode, the HARQ-ACK information bit for each cell may be 1 bit.

If the transmission mode of each cell is not a single codeword transmission mode, the HARQ-ACK information bit for each cell may be 2 bits.

From the two HARQ-ACK information bits for each cell, one bit may indicate HARQ-ACK information on a first codeword and the other bit may indicate HARQ-ACK information on a second codeword.

The generating the encoding information bits comprises obtaining a state information bit indicating state information of each of a plurality of configured cells, generating a synthesized state information bit stream by combining the state information bit of each of the plurality of configured cells, and encoding the synthesized state information bit stream into a binary stream.

A length of the binary stream may be determined based on a number of the plurality of configured cells given by a radio resource control (RRC) signaling.

State information of each of the plurality of configured cells may be mapped to a predetermined state index.

A position of state information bit of each of the plurality of configured cells in the binary stream may be pre-determined.

State information bit of the configured cell which fails to decode a physical downlink control channel (PDCCH) may be set to 0.

In another aspect, a user equipment in a wireless communication system is provided. The user equipment includes a radio frequency (RF) unit for transmitting or receiving a radio signal, and a processor connected to the RF unit, and configured for performing channel coding on information bits of the UCI to generate encoding information bits, modulating the generated encoding information bits to generate complex modulation symbols, block-wise spreading the complex modulation symbols to multiple single carrier-frequency division multiple access (SC-FDMA) symbols on the basis of an orthogonal sequence.

In another aspect, a method for decoding uplink control information (UCI) in a wireless communication system is provided. The method includes obtaining a binary stream for which channel decoding has been carried out, decoding the obtained binary stream into synthesized state information, and obtaining state information of each configured cell from the synthesized state information.

A size of codebook required for a hybrid automatic repeat request (HARQ)-acknowledgement (ACK) can be determined based on the number of configured cells and a transmission mode.

BRIEF DESCRIPTION OF THE DRAWINGS

FIG. 5 shows the structure of an uplink subframe.
FIG. 8 shows a PUCCH format 2/2a/2b.
FIG. 10 shows an example of a scheme in which the subcarrier mapper maps the complex-valued symbols to the respective subcarriers of the frequency domain.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
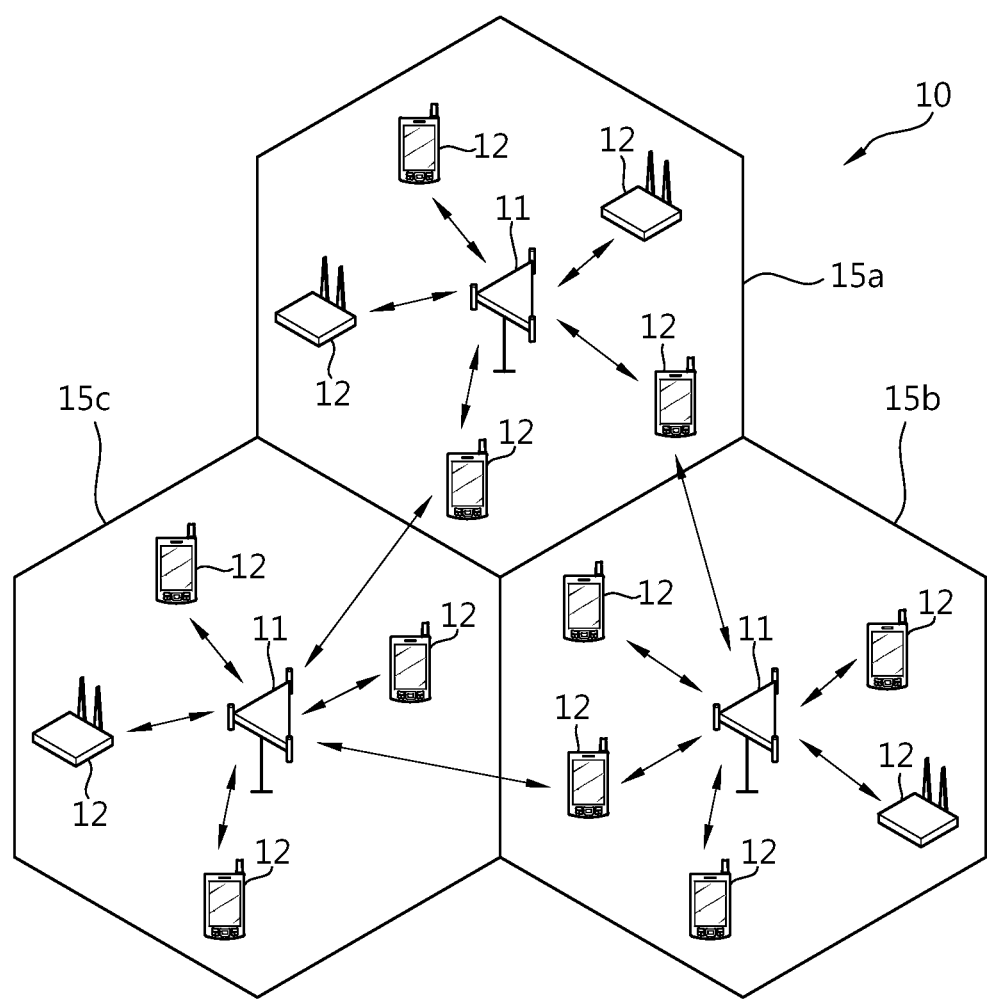
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
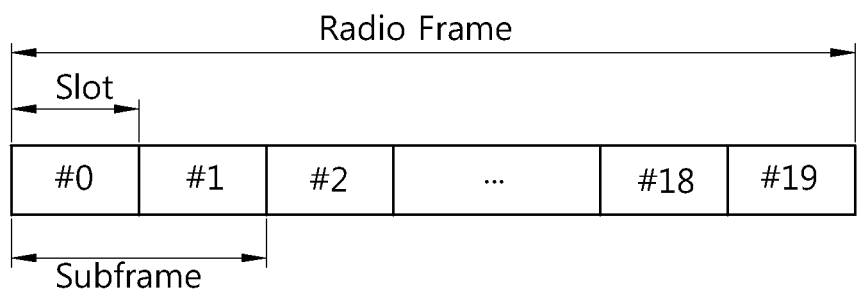
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
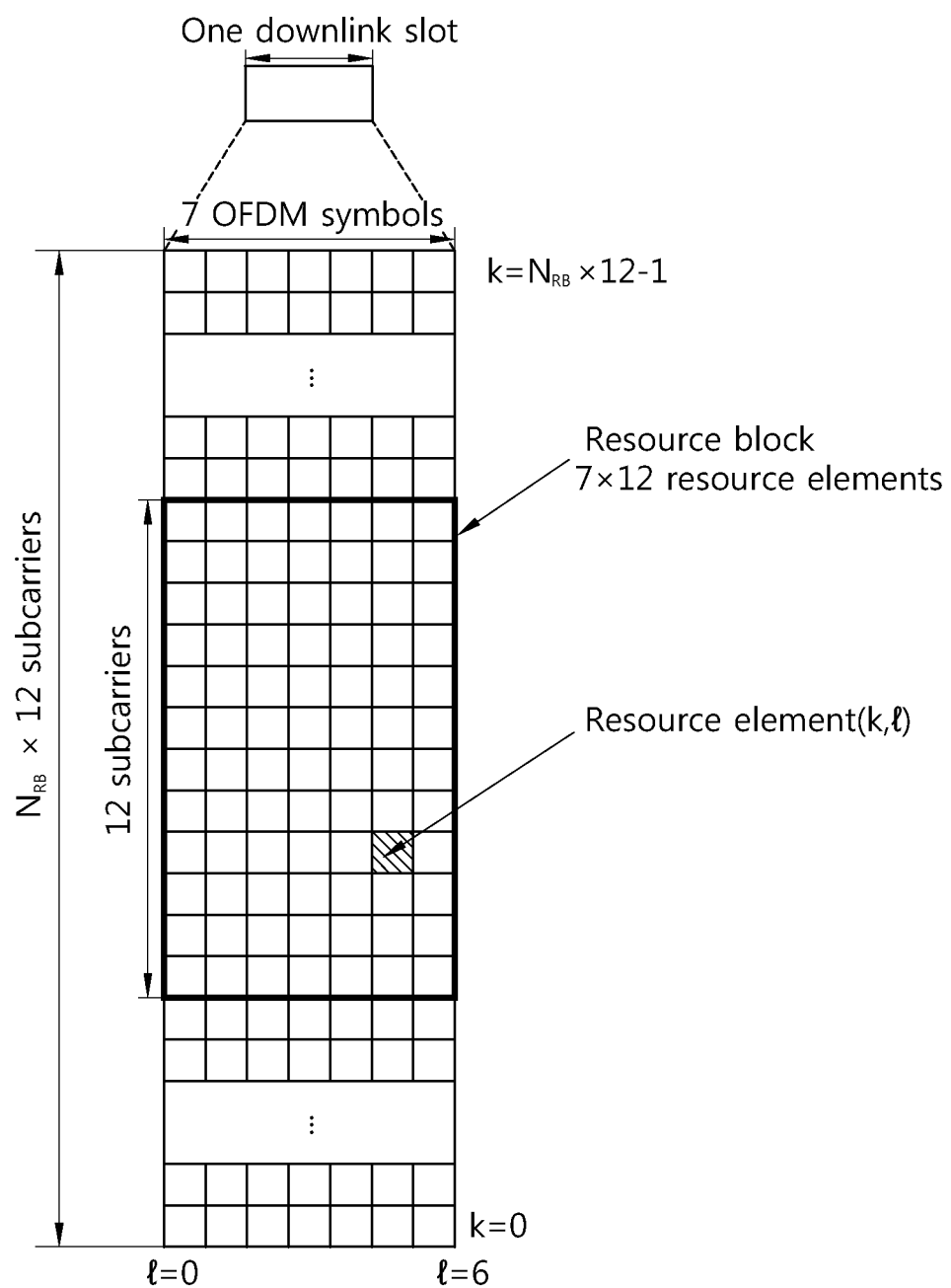
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB}×12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
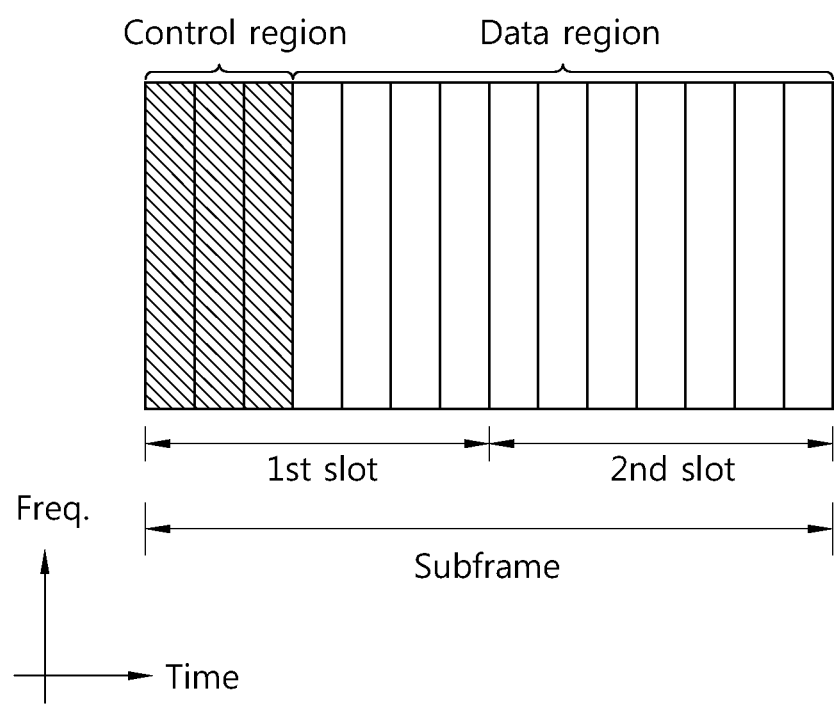
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over interne protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region.

The PUSCH is mapped to a uplink shared channel (UL-SCH), a transport channel. Uplink data transmitted on the PUSCH may be a transport block, a data block for the UL- SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a channel quality indicator (CQI) modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
| --- | --- | --- |
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | set of values for l | |
| --- | --- | --- |
| PUCCH format | Normal cyclic prefix | Extended cyclic prefix |
| 1, 1a, 1b | 2, 3, 4 | 2, 3 |
| 2, 2a, 2b | 1, 5 | 3 |

ACK/NACK signals can be transmitted by using different resources including different cyclic shift values and different Walsh/discrete Fourier transform (DFT) orthogonal codes by using a computer generated constant amplitude zero auto correlation (CG-CAZAC) sequence for each UE. If an available cyclic shift value is 6 and the number of Walsh/DFT codes is 3, 18 UEs having a signal antenna port can be multiplexed in one PRB.

Figure 6:
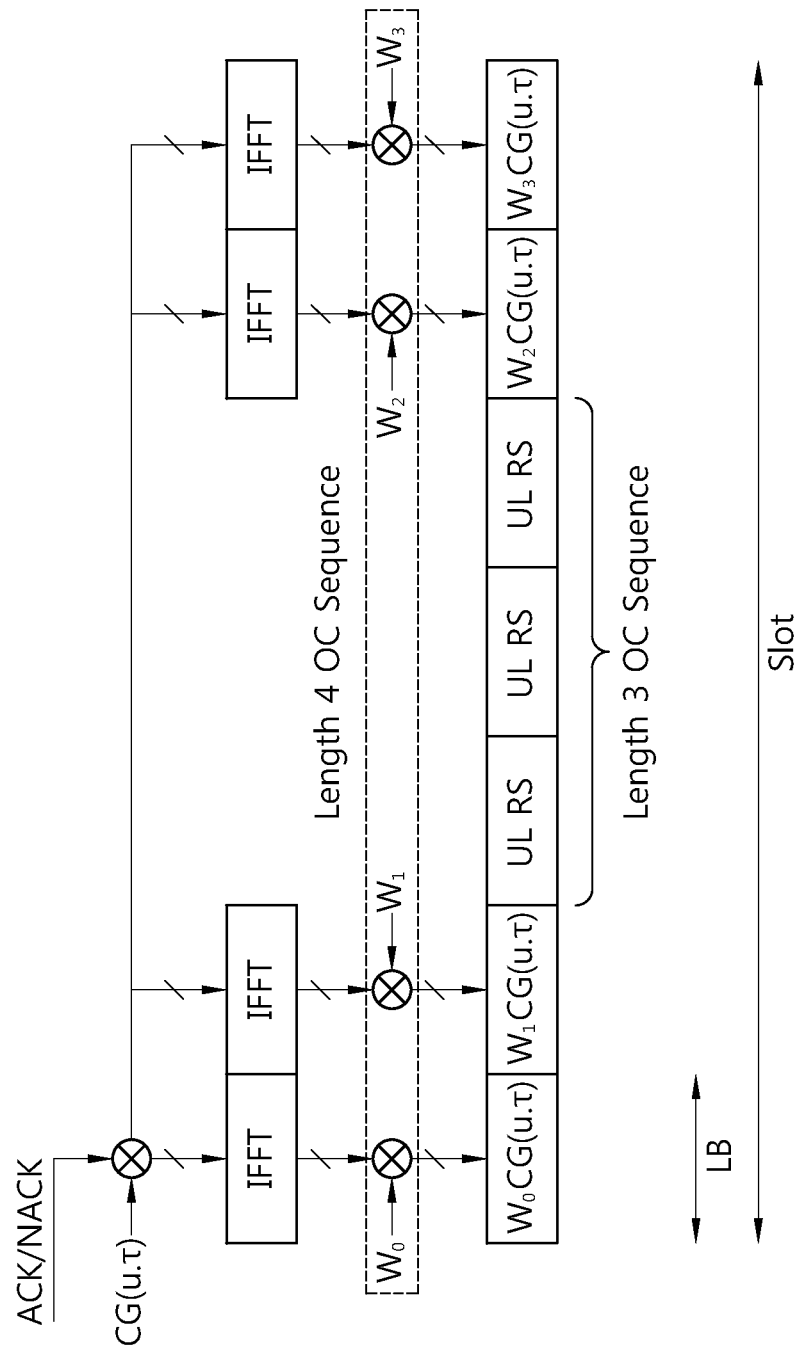
FIG. 6 shows a PUCCH format 1a/1b in a normal CP structure.

FIG. 6 shows a PUCCH format 1a/1b in a normal CP structure. Uplink reference signals are transmitted in $3^{rd}$ to $5^{th}$ SC-FDMA symbols. In FIG. 6, $w_0$, $w_1$, $w_2$ and $w_3$ can be modulated in a time domain after inverse fast Fourier transform (IFFT) modulation, or can be modulated in a frequency domain before IFFT modulation.

Figure 7:
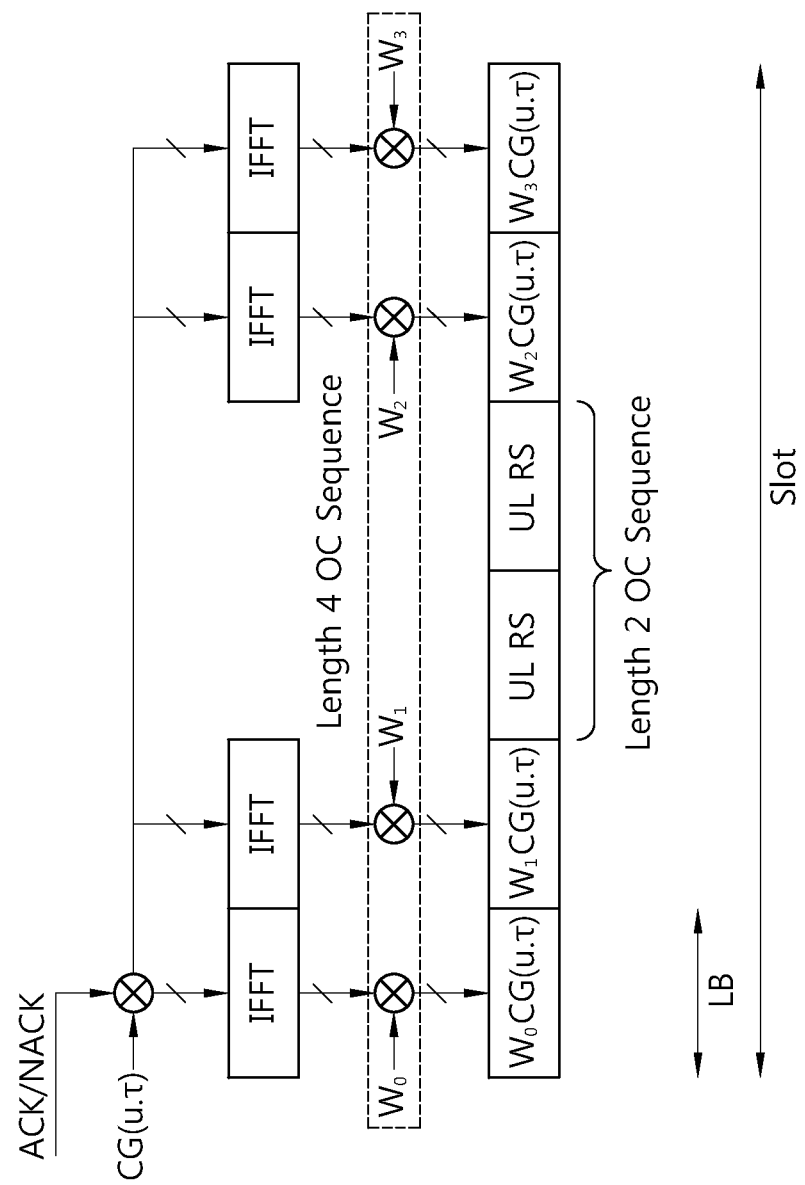
FIG. 7 shows a PUCCH format 1a/1b in an extended CP structure.

FIG. 7 shows a PUCCH format 1a/1b in an extended CP structure. Uplink reference signals are transmitted in $3^{rd}$ and $4^{th}$ SC-FDMA symbols. In FIG. 7, $w_0$, $w_1$, $w_2$ and $w_3$ can be modulated in a time domain after IFFT modulation, or can be modulated in a frequency domain before IFFT modulation.

An ACK/NACK resource including an SR, a cyclic shift assigned to the UE for persistent scheduling, a Walsh/DFT code, a PRB, or the like can be given by using RRC signaling. For non-persistent scheduling for dynamic ACK/NACK, the allocated resource can be given by a lowest CCE index of a PDCCH corresponding to a PDSCH for the ACK/NACK.

Table 4 is an example of an orthogonal sequence with a length of 4 for the PUCCH format 1/1a/1b.

TABLE 4

| Sequence index $n_{oc}(n_s)$ | Orthogonal sequences $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

Table 5 is an example of an orthogonal sequence with a length of 3 for the PUCCH format 1/1a/1b.

TABLE 5

| Sequence index $n_{oc}(n_s)$ | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 6 is an example of an orthogonal sequence for reference signal transmission in the PUCCH format 1/1a/1b.

TABLE 6

| Sequence index $n_{oc2}(n_s)$ | Normal cyclic prefix | Extended cyclic prefix |
| --- | --- | --- |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Table 7 is an example of ACK/NACK channelization when $\Delta_{shift}^{PUCCH}=2$ in a normal CP structure.

TABLE 7

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $n_{OC}'=0$ | $n_{OC}'=1$ | $n_{OC}'=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

In Table 7, $\Delta_{shift}^{PUCCH}$ is a cell-specific cyclic shift value of a CAZAC sequence, and may have any one of values 1 to 3 in a normal CP structure or an extended CP structure. $\delta_{offset}^{PUCCH}$ a cell-specific cyclic shift offset, and may have any one of values 0 to $\Delta_{shift}^{PUCCH}-1$. Meanwhile, $n_{OC}$ is an index of an orthogonal sequence for ACK/NACK, and $n_{OC}'$ is an index of an orthogonal sequence for a reference signal. $n_{CS}$ is a cyclic shift value of a CAZAC sequence, and n' is an ACK/NACK resource index used for channelization in an RB.

Table 8 is an example of channelization of a structure in which a PUCCH format 1/1a/1b and a PUCCH format 2/2a/2b are mixed in a PRB.

TABLE 8

| Cyclic Shift | Orthogonal cover | | |
|---|---|---|---|
| | $OC_{index}=0$ | $OC_{index}=1$ | $OC_{index}=2$ |
| 0 | ACK/NACK | | |
| 1 | ACK/NACK | | |
| 2 | ACK/NACK | | |
| 3 | ACK/NACK | | |
| 4 | Guard shifts | | |
| 5 | CQI | | |
| 6 | CQI | | |
| 7 | CQI | | |
| 8 | CQI | | |
| 9 | CQI | | |
| 10 | CQI | | |
| 11 | Guard shifts | | |

Referring to Table 8, cyclic shift values 0 to 3 for the PUCCH format 1/1a/1b are allocated, and cyclic shift values 5 to 10 for the PUCCH format 2/2a/2b are allocated. Cyclic shift values 4 and 11 between the PUCCH format 1/1a/1b and the PUCCH format 2/2a/2b are allocated as a guard shift.

Meanwhile, cyclic shift hopping can be performed on a symbol basis for inter-cell interference (ICI) randomization. In addition, for the ICI randomization, CS/orthogonal covering (OC) remapping can be performed between an ACK/NACK channel and a resource in a slot level.

A resource for the PUCCH format 1/1a/1b can consist of $n_{cs}$ indicating a cyclic shift in a symbol level, $n_{oc}$ indicating orthogonal covering in a slot level, and $n_{RB}$ indicating a resource block in a frequency domain. $n_r$ can be defined as an index representing the PUCCH format 1/1a/1b resources $n_{cs}$, $n_{oc}$, $n_{RB}$. That is, $n_r=(n_{cs},n_{oc},n_{RB})$.

The PUCCH format 2/2a/2b can carry control information such as a CQI, a precoding matrix indicator (PMI), a rank indicator (RI), CQI+ACK/NACK, etc. A Reed-Muller (RM) channel coding scheme can be applied to the PUCCH format 2/2a/2b.

Table 9 shows an example of a (20,A) RM code used in channel coding of uplink control information (UCI) of 3GPP LTE. A bit-stream $a_0, a_1, a_2, \ldots, a_{A-1}$ is used as an input of a channel coding block using the (20,A) RM code of Table 9.

TABLE 9

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 0 | 1 | 1 | 1 | 0 | 0 | 1 | 0 | 1 | 1 | 1 | 1 |
| 9 | 1 | 0 | 1 | 1 | 1 | 0 | 1 | 0 | 1 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 0 | 1 | 0 | 0 | 1 | 0 | 1 | 1 |

TABLE 9-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoding bits $b_0, b_1, b_2, \ldots, b_{B-1}$ can be generated by Equation 1 below.

$$b_i = \sum_{n=0}^{A-1} (a_n \cdot M_{i,n}) \bmod 2 \quad <\text{Equation 1}>$$

In Equation 1, i=0, 1, 2, . . . , B−1.

Table 10 shows an example of a size of a CQI feedback UCI field for wideband reporting. Table 11 is a case where a single-antenna port is assumed, and transmit diversity or open-loop spatial multiplexing PDSCH transmission is assumed.

TABLE 10

| Field | Bitwidth |
|---|---|
| Wide-band CQI | 4 |

Table 11 is an example of a CQI and PMI feedback UCI field for wideband reporting. Table 11 is a case of closed-loop spatial multiplexing PDSCH transmission.

TABLE 11

| | Bitwidths | | | |
|---|---|---|---|---|
| | 2 antenna ports | | 4 antenna ports | |
| Field | Rank = 1 | Rank = 2 | Rank = 1 | Rank >1 |
| Wide-band CQI | 4 | 4 | 4 | 4 |
| Spatial differential CQI | 0 | 3 | 0 | 3 |
| Precoding matrix indication | 2 | 1 | 4 | 4 |

Table 12 is an example of a size of an RI feedback UCI field for wideband reporting.

TABLE 12

| | Bitwidths | | |
|---|---|---|---|
| | | 4 antenna ports | |
| Field | 2 antenna ports | Max 2 layers | Max 4 layers |
| Rank indication | 1 | 1 | 2 |

In this case, $a_0$ and $a_{A-1}$ respectively denote a most significant bit (MSB) and a least significant bit (LSB). In the extended CP structure, A can be up to 11 except for a case where CQI and ACK/NACK are simultaneously transmitted. QPSK modulation can be applied to control information encoded into 20 bits by using an RM code. In addition, the encoded control information can be scrambled before QPSK modulation.

FIG. 8 shows a PUCCH format 2/2a/2b. FIG. 8(a) shows a normal CP structure, and FIG. 8(b) shows an extended CP structure. In FIG. 8(a), reference signals are transmitted in $2^{nd}$ and $6^{th}$ SC-FDMA symbols. In FIG. 8(b), reference signals are transmitted in a $4^{th}$ SC-FDMA symbol.

In a normal CP structure, one subframe includes 10 QPSK data symbols except for an SC-FDMA symbol for reference signal transmission. That is, each QPSK symbol can be spread by a cyclic shift in an SC-FDMA symbol level by using a 20-bit encoded CQI.

In addition, SC-FDMA symbol level cyclic shift hopping can be applied for ICI randomization. A reference signal can be multiplexed according to code division multiplexing (CDM) by using a cyclic shift. For example, if the number of available cyclic shift values is 12, 12 UEs can be multiplexed in one PRB. That is, each of a plurality of UEs in a PUCCH format 1/1a/1b and a PUCCH format 2/2a/2b can be multiplexed by using a cyclic shift/orthogonal covering/resource block and a cyclic shift/resource block.

A PRB used for PUCCH transmission in a slot $n_s$ can be determined by Equation 2.

$$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases} \quad <\text{Equation 2}>$$

In Equation 2, $n_{PRB}$ denotes a PRB index. $N_{RB}^{UL}$ is an uplink bandwidth configuration expressed with a multiple of $N_{SC}^{RB}$. $N_{SC}^{RB}$ is a size of a resource block in a frequency domain and is expressed with the number of subcarriers. When the PRB is mapped to a PRB, the PUCCH can be mapped in the order of an outer PRB and an inner PRB. In addition, it can be mapped in the order of a PUCCH format 2/2a/2b, an ACK/NACK combination format, and a PUCCH format 1/1a/1b.

In the PUCCH format 1/1a/1b, m can be determined by Equation 3.

$$m = \quad <\text{Equation 3}>$$

$$\begin{cases} N_{RB}^{(2)} & \text{if } n_{PUCCH}^{(1)} < c \cdot N_{cs}^{(1)}/\Delta_{shift}^{PUCCH} \\ \left\lfloor \dfrac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

In Equation 3, $N_{RB}^{(2)}$ denotes a bandwidth expressed with a resource block that can be used in the PUCCH format 2/2a/2b in each slot. $n_{PUCCH}^{(1)}$ denotes an index of a resource used for PUCCH format 1/1a/1b transmission. $N_{CS}^{(1)}$ denotes the number of cyclic shift values used for the PUCCH format 1/1a/1b in a resource block used in a mixed structure of the PUCCH format 1/1a/1b and format 2/2a/2b.

In the PUCCH format 2/2a/2b, m can be determined by Equation 4.

$$m = \lfloor n_{PUCCH}^{(2)} / N_{SC}^{RB} \rfloor \qquad \text{<Equation 4>}$$

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 9:
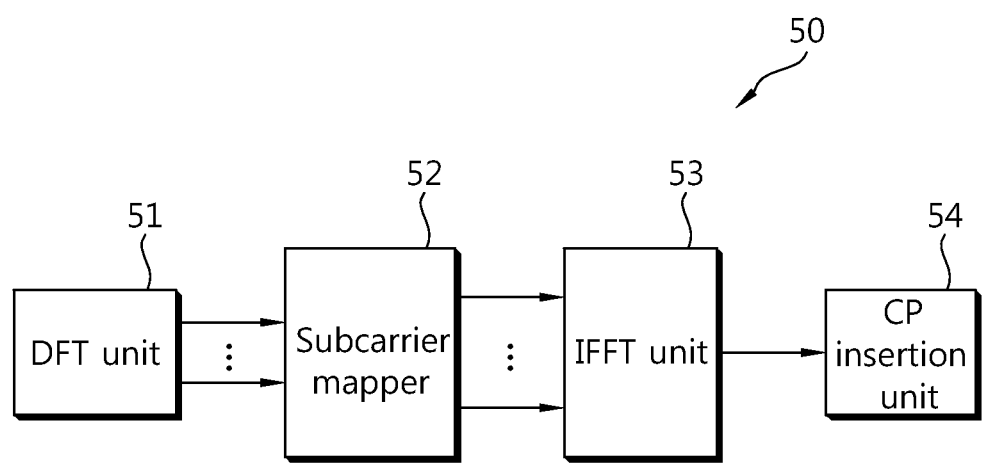
FIG. 9 shows an example of the structure of a transmitter in an SC-FDMA system.

FIG. 9 shows an example of the structure of a transmitter in an SC-FDMA system.

Referring to FIG. 9, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

FIG. 10 shows an example of a scheme in which the subcarrier mapper maps the complex-valued symbols to the respective subcarriers of the frequency domain.

Referring to FIG. 10(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 10(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 10(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 11:
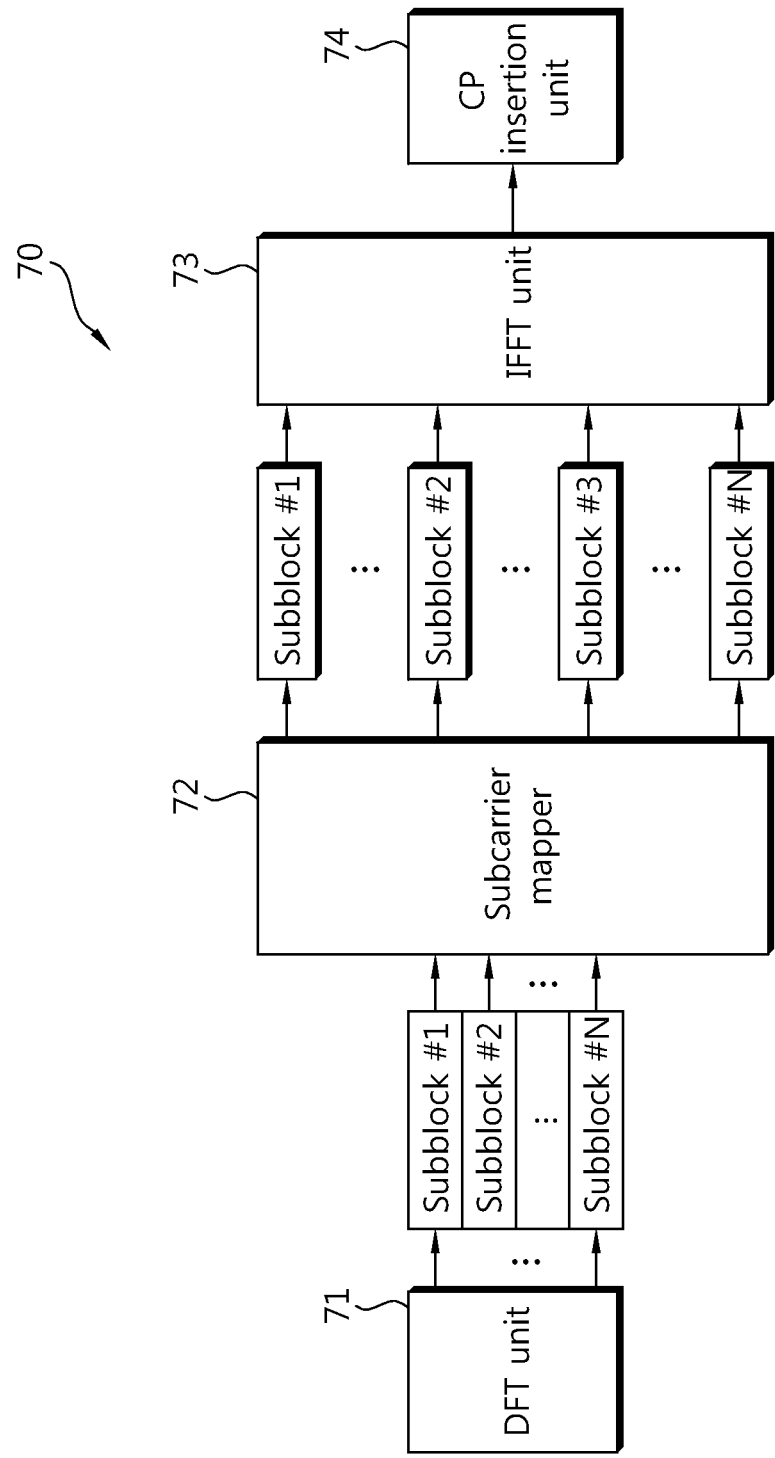
FIG. 11 shows an example of a transmitter using the clustered DFT-s OFDM transmission scheme.

FIG. 11 shows an example of a transmitter using the clustered DFT-s OFDM transmission scheme.

Referring to FIG. 11, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, . . . , a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 11 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 12:
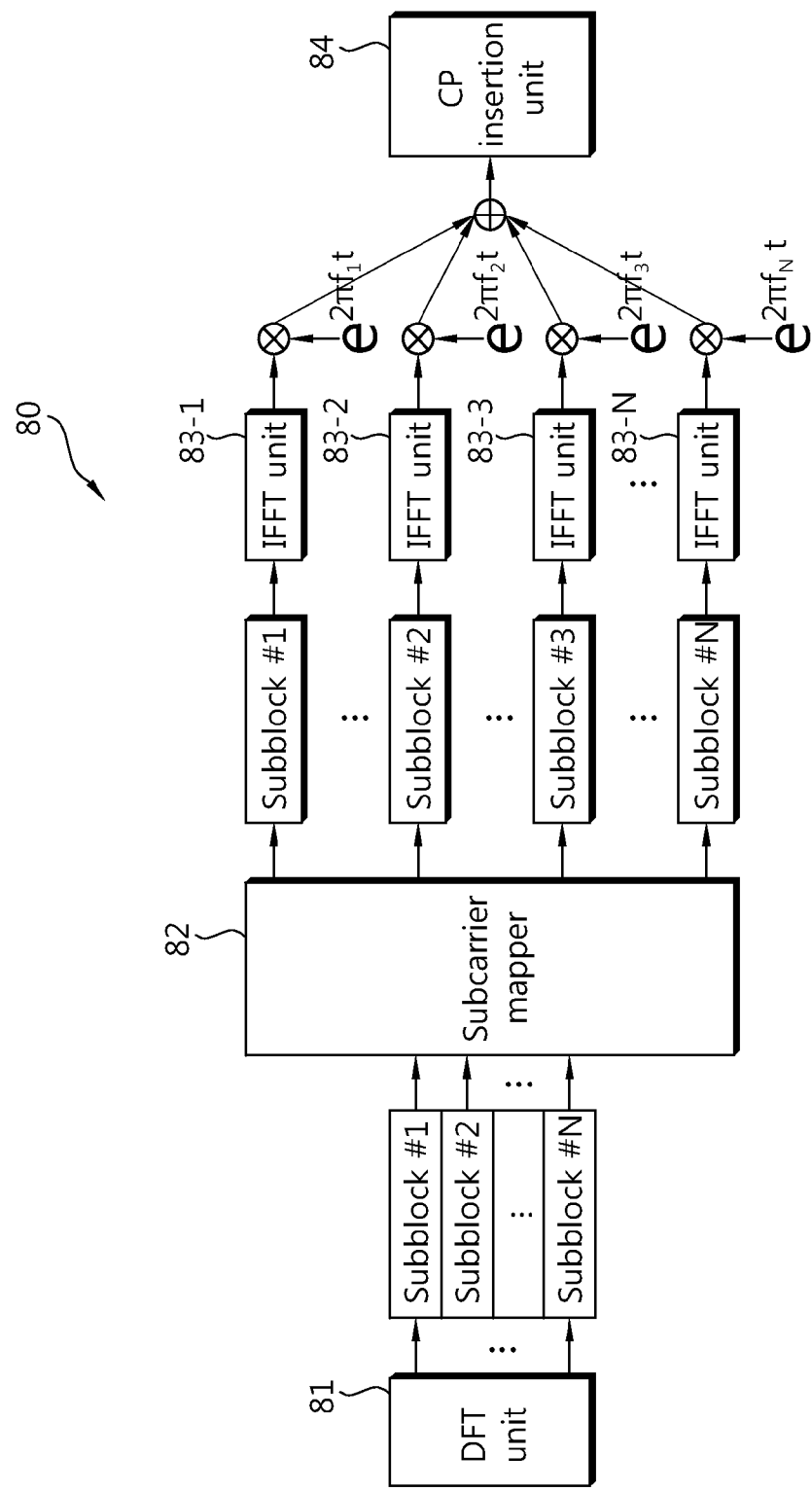
FIG. 12 shows another example of a transmitter using the clustered DFT-s OFDM transmission scheme.

FIG. 12 shows another example of a transmitter using the clustered DFT-s OFDM transmission scheme.

Referring to FIG. 12, the transmitter 80 includes a DFT unit 81, a subcarrier mapper 82, a plurality of IFFT units 83-1, 83-2, . . . , 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-n outputs an nth baseband signal (n=1, 2, . . . , N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 12 may be used in a discontinuous carrier allocation situation where carriers allocated to the transmitter are not contiguous to each other.

Figure 13:
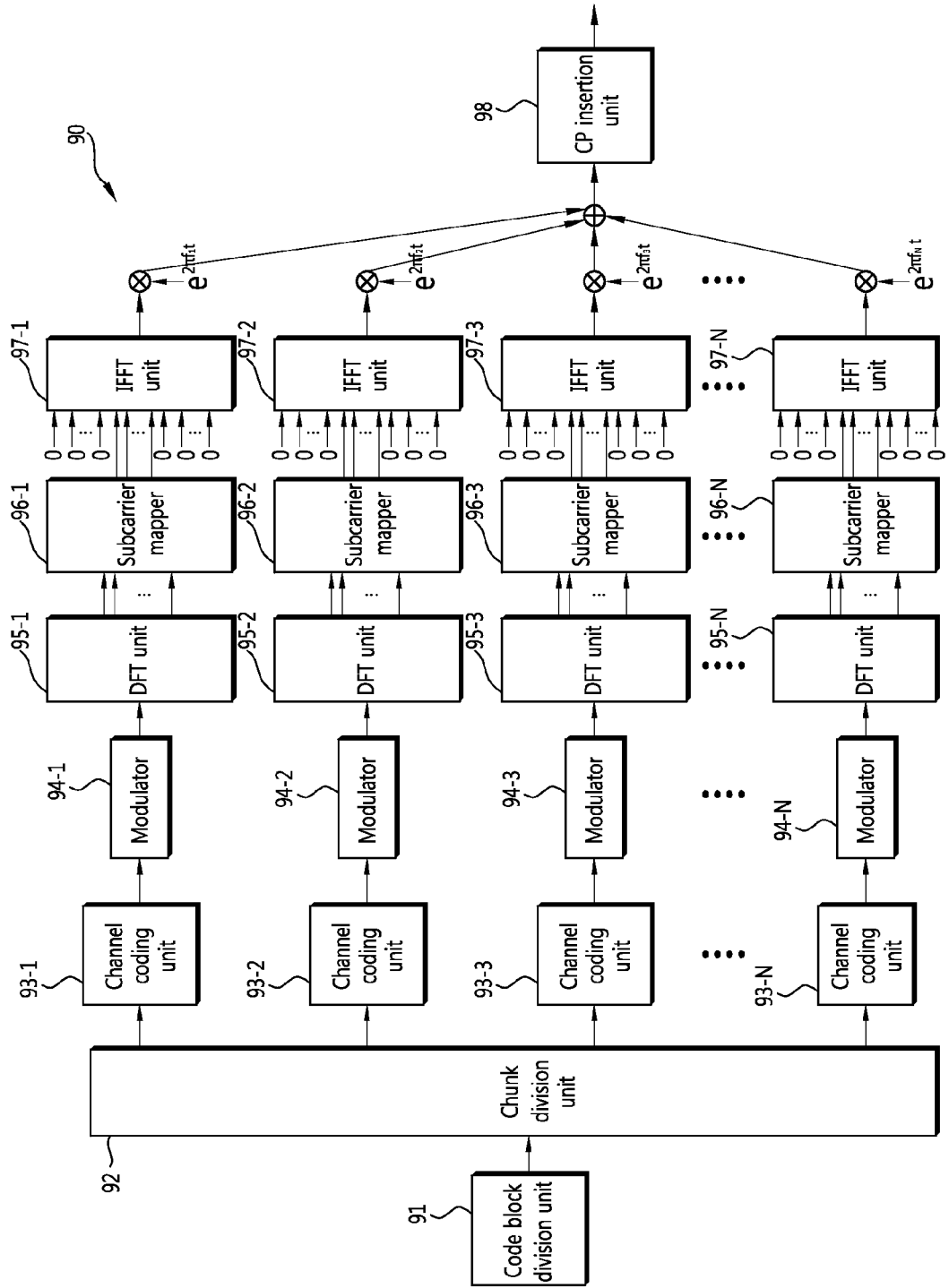
FIG. 13 shows another example of a transmitter using the clustered DFT-s OFDM transmission scheme.

FIG. 13 is another example of a transmitter using the clustered DFT-s OFDM transmission scheme.

FIG. 13 is a chunk-specific DFT-s OFDM system performing DFT precoding on a chunk basis. This may be called Nx SC-FDMA. Referring to FIG. 13, the transmitter 90 includes a code block division unit 91, a chunk division unit 92, a plurality of channel coding units 93-1, . . . , 93-N, a plurality of modulators 94-1, . . . , 94-N, a plurality of DFT units 95-1, . . . , 95-N, a plurality of subcarrier mappers 96-1, . . . , 96-N, a plurality of IFFT units 97-1, . . . , 97-N, and a CP insertion unit 98. Here, N may be the number of multiple carriers used by a multi-carrier transmitter. Each of the channel coding units 93-1, . . . , 93-N may include a scramble unit (not shown). The modulators 94-1, . . . , 94-N may also be called modulation mappers. The transmitter 90 may further include a layer mapper (not shown) and a layer permutator (not shown) which may be placed in front of the DFT units 95-1, . . . , 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in the uplink is equal to the number of carriers used in the downlink, it is necessary to configure such that all CCs are compatible with the LTE Rel-8 system.

In order to efficiently use the plurality of carriers, the plurality of carriers can be managed in a media access control (MAC). To transmit/receive the plurality of carriers, a transmitter and a receiver both have to be able to transmit/receive the plurality of carriers.

Figure 14:
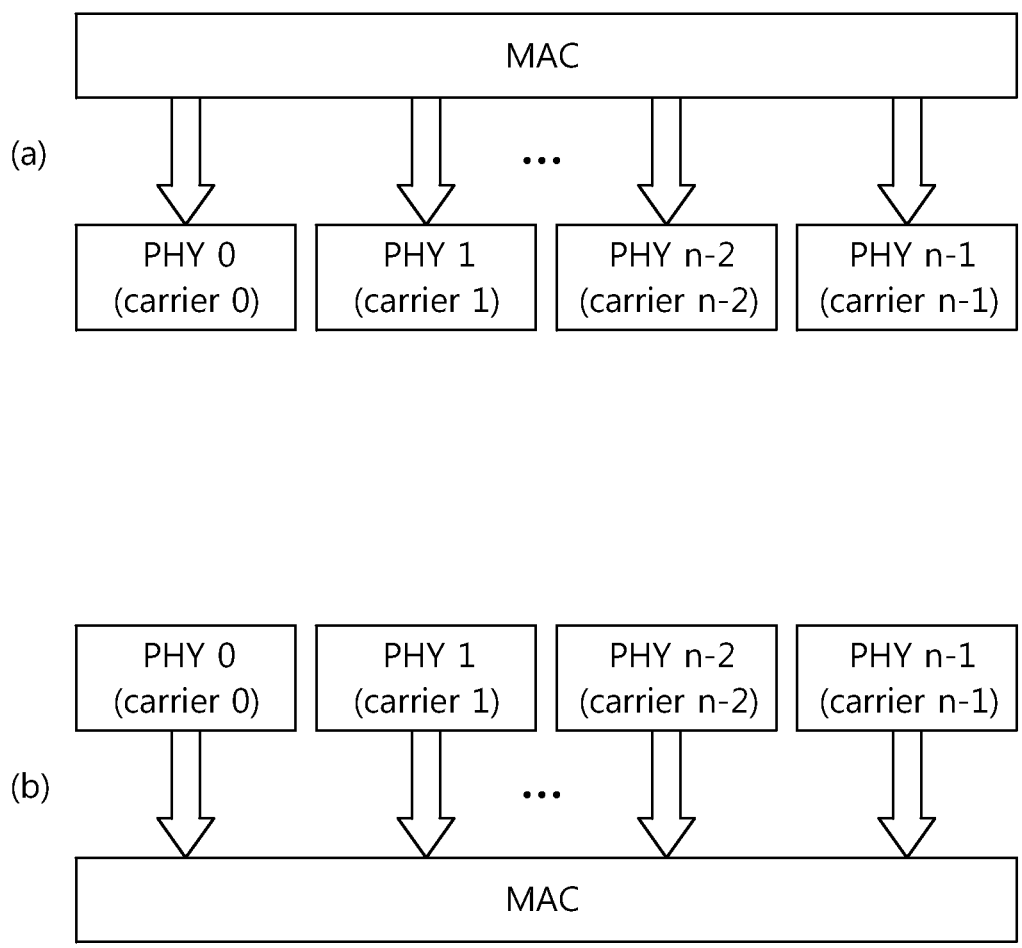
FIG. 14 shows an example of a transmitter and a receiver which constitute a carrier aggregation system.

FIG. 14 shows an example of a transmitter and a receiver which constitute a carrier aggregation system.

In the transmitter of FIG. 14(*a*), one MAC transmits and receives data by managing and operating all of n carriers. This is also applied to the receiver of FIG. 14(*b*). From the perspective of the receiver, one transport block and one HARQ entity may exist per CC. A UE can be scheduled simultaneously for a plurality of CCs. The carrier aggregation system of FIG. 14 can apply both to a contiguous carrier aggregation system and a non-contiguous carrier aggregation system. The respective carriers managed by one MAC do not have to be contiguous to each other, which results in flexibility in terms of resource management.

Figure 15:
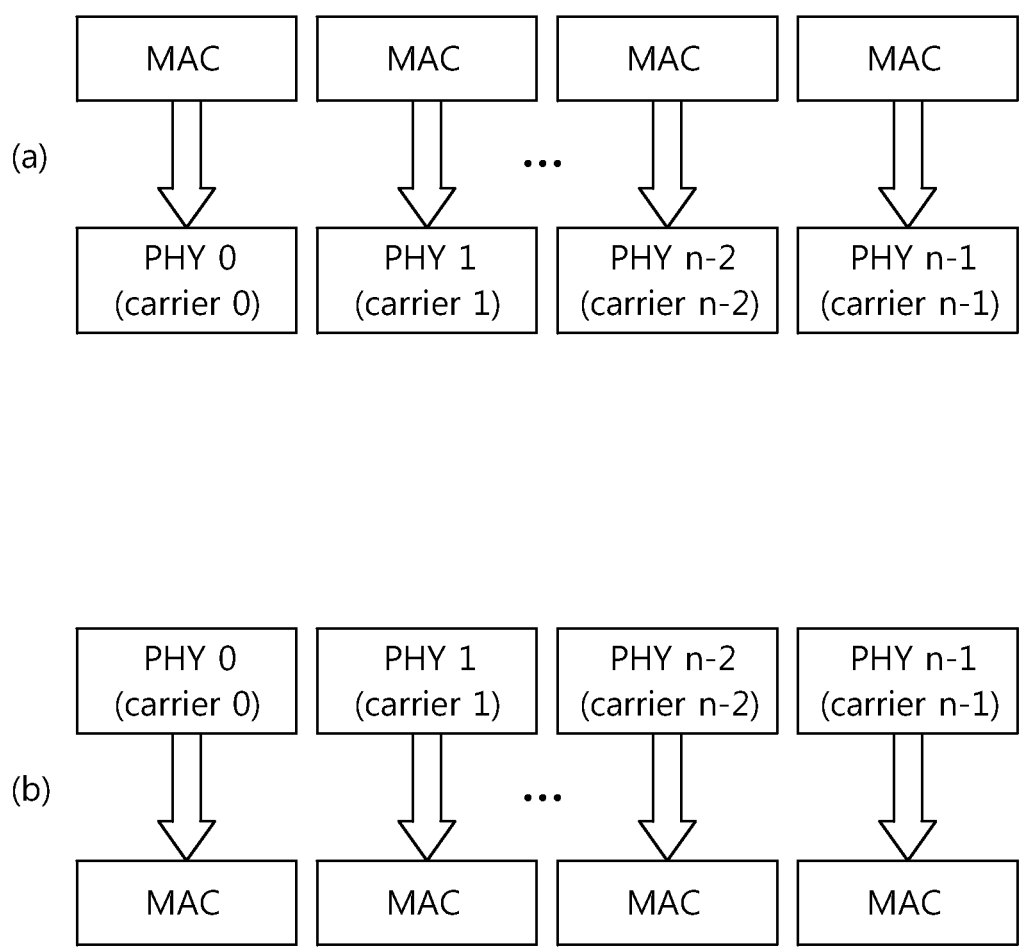
FIGS. 15 and 16 show another example of a transmitter and a receiver which constitute a carrier aggregation system.
Figure 16:
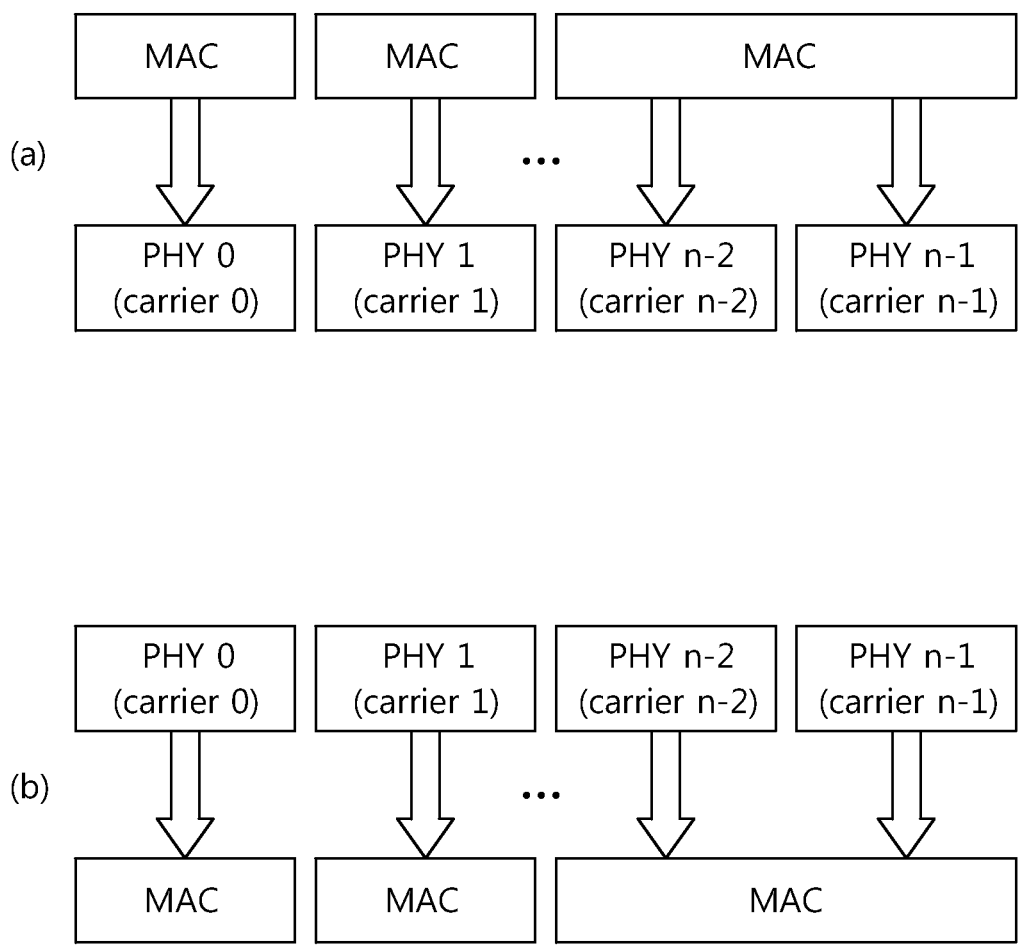

FIG. 15 and FIG. 16 are other examples of a transmitter and a receiver which constitute a carrier aggregation system.

In the transmitter of FIG. 15(*a*) and the receiver of FIG. 15(*b*), one MAC manages only one carrier. That is, the MAC and the carrier are 1:1 mapped. In the transmitter of FIG. 16(*a*) and the receiver of FIG. 16(*b*), a MAC and a carrier are 1:1 mapped for some carriers, and regarding the remaining carriers, one MAC controls a plurality of CCs. That is, various combinations are possible based on a mapping relation between the MAC and the carrier.

The carrier aggregation system of FIG. 14 to FIG. 16 includes n carriers. The respective carriers may be contiguous to each other or may be separated from each other. The carrier aggregation system can apply both to uplink and downlink transmissions. In a TDD system, each carrier is configured to be able to perform uplink transmission and downlink transmission. In an FDD system, a plurality of CCs can be used by dividing them for an uplink usage and a downlink usage. In a typical TDD system, the number of CCs used in uplink transmission is equal to that used in downlink transmission, and each carrier has the same bandwidth. The FDD system can configure an asymmetric carrier aggregation system by allowing the number of carriers and the bandwidth to be different between uplink and downlink transmissions.

Meanwhile, from a perspective of a UE, there is one transport block and one hybrid automatic repeat request (HARQ) entity per scheduled component carrier. Each transport block is mapped to only a single component carrier. The UE can be simultaneously mapped to multiple component carriers.

In what follows, a method for encoding uplink control information according to the present invention will be described.

Figure 17:
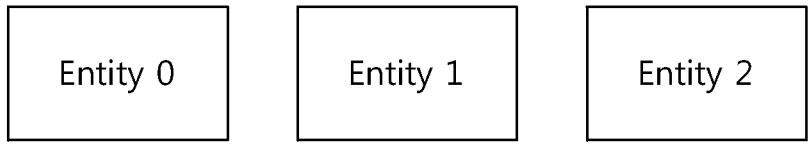
FIG. 17 illustrates three entities.

FIG. 17 illustrates three entities. Feedback information on the three entities can be transmitted through an arbitrary channel for downlink or uplink. If it is assumed that five states are allowed for each entity, the number of bits required for feedback of the five states would be $\log_2 5 = 2.2319 < 3$. Therefore, three bits are allocated for feedback of each entity, and a total of nine bits are allocated to transmit feedback information of the three entities. However, the three entities can take a total of 15 states and the number of bits required for feedback of the 15 states becomes $\log_2 15 = 3.9069 < 4$. Accordingly, five bits are remained unused.

Therefore, to transmit feedback information of a plurality of entities efficiently, the present invention provides a method for transmitting feedback information by encoding the feedback information into a binary bit stream so that channel coding or modulation may be carried out with an optimized bit size for the corresponding state information. Also, the present invention provides a method for decoding a binary bit stream encoded at a receiver back to the corresponding state information. The present invention encodes feedback information as a closed-form, thereby obviating an encoding table. Therefore, the present invention does not require a memory to store an encoding table. However, the present invention still allows implementation for generating an encoding table and storing the table into a memory for later use. Meanwhile, in the following, an entity may represent a codeword, a downlink component carrier (DL CC), an uplink component carrier (UL CC), a base station, a terminal, a relay station, or a pico/femto cell. Also, in what follows, feedback information may correspond to one of control signals, including a HARQ ACK/NACK signal, DTX (discontinuous transmission), a channel quality indicator (CQI), a precoding matrix indicator (PMI), a rank indicator (RI), and covariance matrix.

Figure 18:
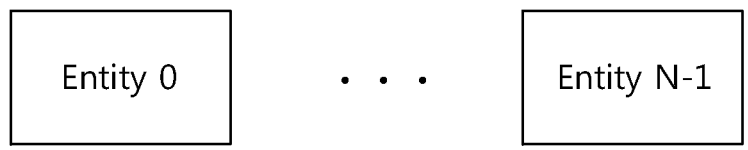
FIG. 18 illustrates a plurality of entities.

FIG. 18 illustrates a plurality of entities. A total of N entities exist and it is assumed that the number of state information for the entity #i (i.e., the amount of feedback information) is M(i). Therefore, the total amount of feedback becomes N*M(i).

Figure 19:
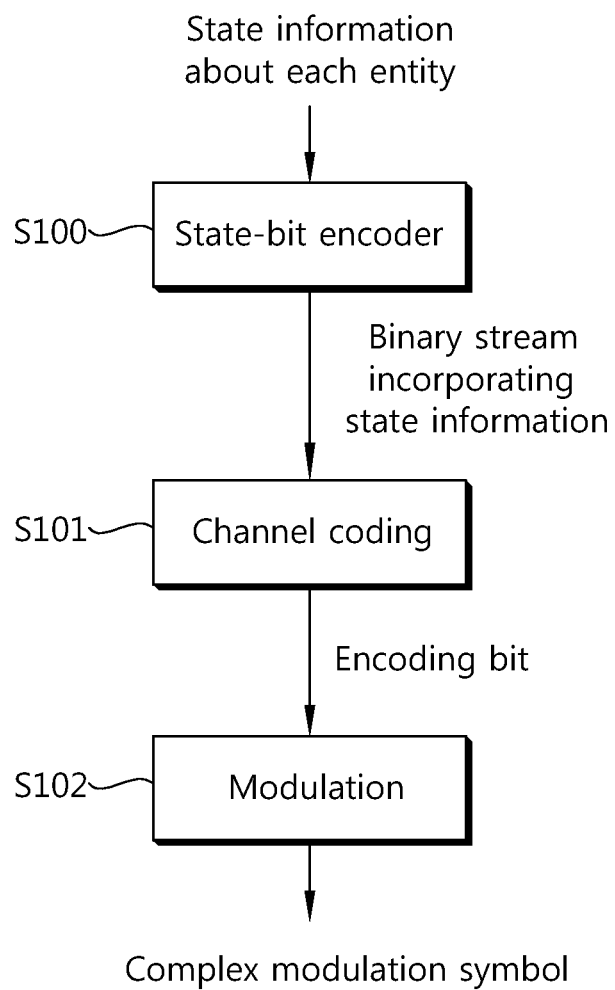
FIG. 19 is an example of a method for transmitting feedback information according to an embodiment of the present invention.

FIG. 19 is an example of a method for transmitting feedback information according to an embodiment of the present invention.

With reference to FIG. 19, state information for feedback of each entity is combined together and encoded into a binary stream at step S100. Encoding into the binary stream may be carried out by a state-to-bit encoder, which will be described later in FIG. 20.

Channel coding for the binary stream is carried out at step S101. For a channel coding scheme, one of various types of coding methods, including repetition, simplex coding, RM coding, punctured RM coding, tail-biting convolutional coding (TBCC), low density parity check (LDPC) coding, and turbo coding, can be employed. Rate-matching may be applied to the encoding information bit generated as a result of channel coding by taking account of a modulation symbol order to be applied and resources to be mapped. Cell-specific scrambling using a scrambling code corresponding to a cell ID or UE-specific scrambling using a scrambling code corresponding to a UE ID (e.g., radio network temporary identifier (RNTI)) may be applied for randomization of inter-cell interference (ICI) for generated encoding information bit.

The encoding information bit is modulated by a modulator at step S102. For a modulation scheme, various types of modulation methods can be used, including binary phase shift keying (BPSK), quadrature phase shift keying (QPSK), 16 QAM (quadrature amplitude modulation), and 64 QAM. Complex modulated symbols are generated as the encoding information bit is modulated.

Figure 20:
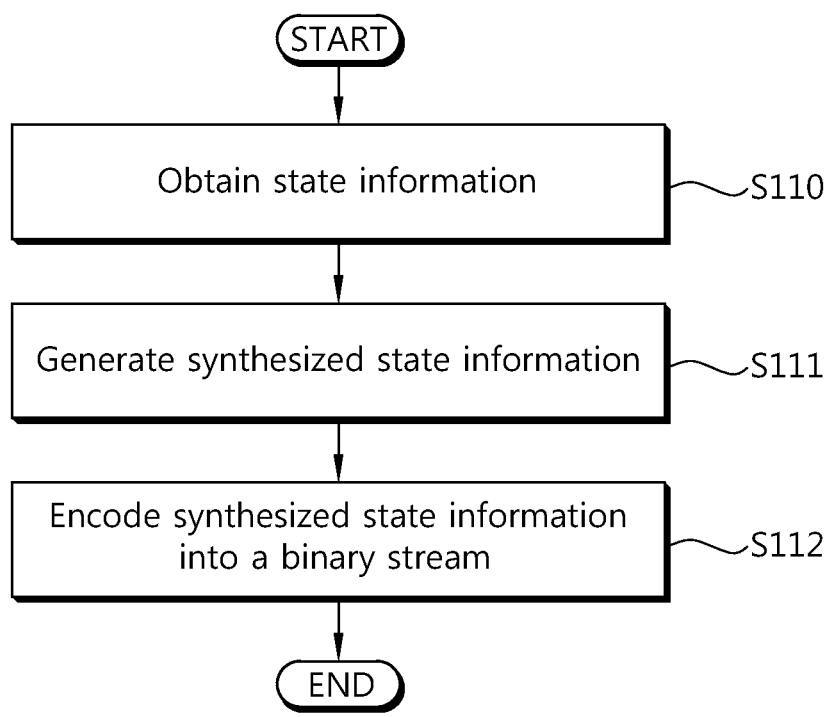
FIG. 20 is an example of a method for encoding uplink control information carried out by a state-bit encoder according to an embodiment of the present invention.

FIG. 20 is an example of a method for encoding uplink control information carried out by a state-bit encoder according to an embodiment of the present invention.

The state-bit encoder obtains state information S(i) for each entity at step S110. The state-bit encoder combines the state information S(i) and generates synthesized state information at step S111. The state-bit encoder encodes the synthesized state information into a binary stream at step S112.

In what follows, a method for encoding uplink control information according to the present invention will be described in more detail.

Suppose state information for an entity i is S(i). Then, synthesized state information $S_{total}$ can be generated according to Equation 5. If it is assumed that the number of entities is N, i=0, . . . , N−1, and if the number of states of the entity i, namely, the amount of feedback of the entity i is M(i), 0≤S(i)<M(i).

$$S_{total}=S(0)+K_0 \cdot M(0) \qquad \text{<Equation 5>}$$

where $K_n=S(n+1)+K_{n+1} \cdot M(n+1)$
n=0, . . . , N−1
$K_{N-1}=0$

At this time, $S_{total}$ may be a decimal number. Equation 5 is one example of mathematical equations that generate $S_{total}$ as i is increased from its smallest value. However, $S_{total}$ can be generated regardless of the order of magnitude of i. In the subsequent description, it is assumed that $S_{total}$ is generated according to Equation 5.

If the number of states of each entity is the same to each other, namely, if the amount of feedback of each entity is the same to each other, M=M(n), n=0, . . . , N−1 and Equation 5 can be expressed by Equation 6.

$$S_{total}=S(0)+ \ldots +S(N-1) \cdot M^{N-1} \qquad \text{<Equation 6>}$$

In other words, each digit of a number, which is an M-nary expression of $S_{total}$ according to Equation 6, now represents the state information for each entity.

If $S_{total}$ generated according to Equation 5 is converted into a binary stream, the binary stream can be expressed as [$b_0$ $b_1$ . . . $b_{L-1}$] and each individual binary value $b_n$ can be obtained by Equation 7.

$$S_{total}=b_0+ \ldots +b_{L-1} \cdot 2^{L-1}$$

$$S_{total}=b_{L-1}+b_{L-2} \cdot 2^1 \ldots +b_0 \cdot 2^{L-1} \qquad \text{<Equation 7>}$$

At this time, L can be expressed as $$L = \left\lceil \log_2 \left( \prod_{i=0}^{N-1} M(i) \right) \right\rceil.$$

If conversion into a binary stream as expressed in Equation 7 is based on Equation 6, L can be expressed as L=⌈$\log_2(M^N)$⌉.

Meanwhile, the order of binary values within a binary stream generated according to Equation 7 can be changed. In other words, interleaving can be applied to the binary stream. Interleaving is introduced to reinforce the randomization effect. For example, if a binary stream generated when L=4 is [b0 b1 b2 b3], [b2 b0 b3 b1] can be generated by applying one of randomized interleaving patterns. The interleaving pattern can be applied in such a way of changing the order of $b_n$ appearing in the first equation of Equation 7 in a random manner. Also, the interleaving pattern can be applied being optimized by taking the hamming distance into account. An interleaver carrying out interleaving may be a random interleaver or a pre-determined interleaver or a random interleaver generated by incorporating a physical cell ID (PCI) generated by a PN code or UE-ID (e.g., cell-radio network temporary identifier (C-RNTI)) as a seed. Interleaving may also be applied to encoding information bit generated by channel coding. In the following description, it is assumed that a binary stream is generated by the first equation of Equation 7 without taking account of interleaving.

Figure 21:
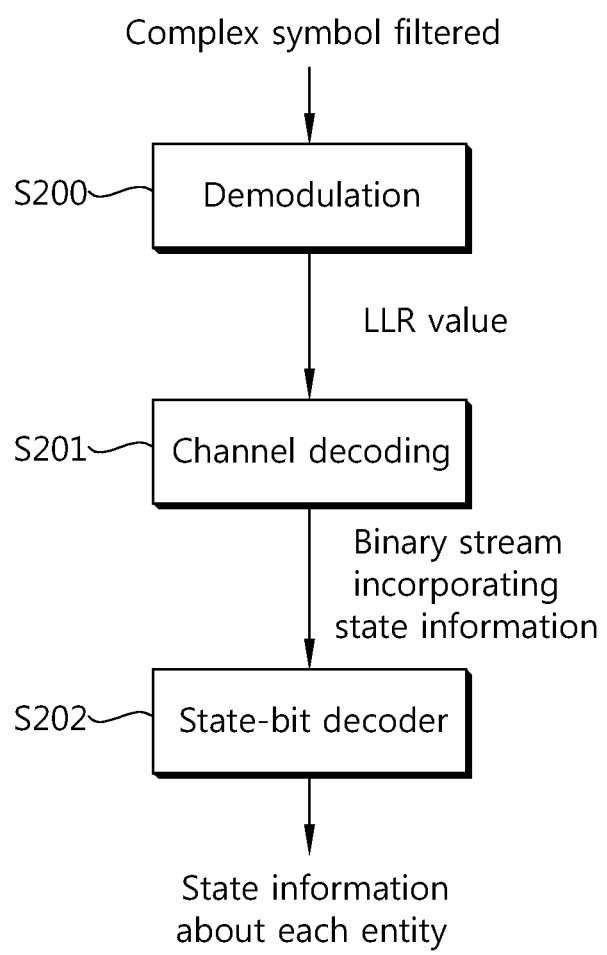
FIG. 21 is an example of a method for receiving feedback information when the corresponding feedback information is transmitted by a method for encoding uplink control information according to an embodiment of the present invention.

FIG. 21 is an example of a method for receiving feedback information when the corresponding feedback information is transmitted by a method for encoding uplink control information according to an embodiment of the present invention.

A filtered complex symbol is demodulated at step S200. A modulation scheme employed for modulating complex modulation symbols may be used for a demodulation scheme. In other words, various types of demodulation schemes can be used, including BPSK, QPSK, 16 QAM, and 64 QAM. While the filtered complex symbols are demodulated, a log-likelihood ratio (LLR) values are calculated.

Channel decoding is carried out for the LLR value at step S201. A channel coding scheme employed for channel coding can also be used as a channel decoding scheme. In other words, for a channel decoding method, one of various kinds of decoding schemes including simple repetition, simplex coding, RM coding, punctured RM coding, TBCC, LDPC coding, and turbo coding may be used. By channel decoding, a binary stream incorporating state information is reconstructed.

The binary stream is decoded into state information for each entity at step S202. Decoding to the state information for each entity may be carried out by a state-to-bit decoder, which will be described later in FIG. 22.

Figure 22:
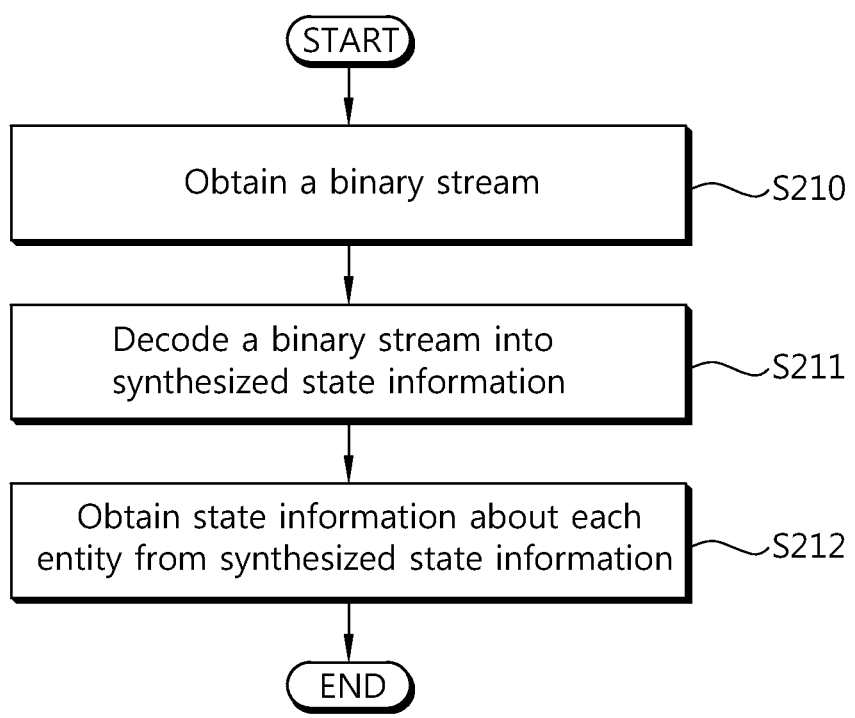
FIG. 22 is an example of a method for decoding uplink control information carried out by a state-bit decoder according to an embodiment of the present invention.

FIG. 22 is an example of a method for decoding uplink control information carried out by a state-bit decoder according to an embodiment of the present invention.

A state-to-bit decoder obtains a binary stream for which channel decoding has been carried out at step S210.

The state-to-bit decoder decodes the binary stream obtained into synthesized state information at step S211.

The state-to-bit decoder obtains state information for each entity from the synthesized state information at step S212.

Now, a method for decoding uplink control information according to the present invention is described in more detail. A method for decoding uplink control information is carried out in a reverse order of a method for uplink control information encoding method.

If it is assumed that a bit steam obtained by demodulating a received signal and carrying out channel decoding is [$b_0'$ $b_1'$ ... $b_{L-1}'$] synthesized state information $S_{total}'$ which can be obtained from the bit stream can be calculated by Equation 8.

$$S'_{total} = b'_0 + \ldots + b'_{L-1} \cdot 2^{L-1} \qquad \text{<Equation 8>}$$

State information $S(i)'$ for each entity can be calculated by Equation 9.

$$S'_{total} = S'(0) + K'_0 \cdot M(0) \qquad \text{<Equation 9>}$$

$K'_n = S'(n+1) + K'_{n+1} \cdot M(n+1)$
n=0, ..., N−1
$K'_{N-1} = 0$

If the amount of feedback of each entity is the same to each other, namely, if M=M(n), n=0, 1, ..., N−1, state information $S(i)'$ for each entity can be calculated by Equation 10.

$$S'_{total} = S'(0) + \ldots + S'(N-1) \cdot M^{N-1} \qquad \text{<Equation 10>}$$

In what follows, a method for encoding uplink control information according to the present invention will be described with reference to a specific embodiment.

First, described will be an example of a method for encoding uplink control information in the case where each DL CC transmits two codewords in a carrier aggregation system comprised of five DL CCs.

Figure 23:
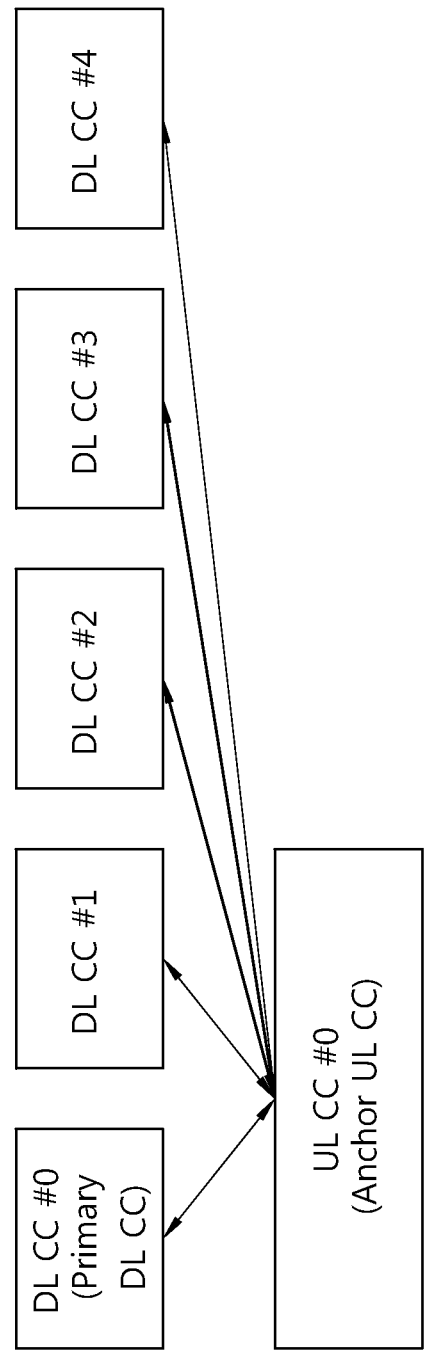
FIG. 23 is a block diagram illustrating a case where one UL CC corresponds to five DL CCs in a carrier aggregation system.

FIG. 23 is a block diagram illustrating a case where one UL CC corresponds to five DL CCs in a carrier aggregation system. For the convenience of description, the present invention assumes an asymmetric carrier aggregation system comprised of five DL CCs and one UL CC. However, the present invention is not limited to the above assumption. Therefore, the present invention can be applied to various kinds of DL-UL configurations. With reference to FIG. 23, downlink data are transmitted on each PDSCH of DL CC #0 to #4 and feedback information such as ACK/NACK signal or DTX signal in response to the data can be transmitted through PUCCH, extended PUCCH, or PUSCH of UL CC #0.

If the present invention is applied to the carrier aggregation system of FIG. 23, each DL CC may correspond to one entity and feedback information becomes ACK/NACK signal or DTX signal. Also, it is assumed that two bits of ACK/NACK state and DTX state about two codewords are supported. In other words, since five pieces of state information are needed for each DL CC, a total of 3125 (=$5^5$) pieces of state information are needed.

A state index can be mapped to each of five pieces of state information for one DL CC. Tables 13 to 16 are one example of mapping state index to state information. At this time, mapping of state index and ACK/NACK/DTX state may take account of hamming distance. Also, it should be noted that Tables 13 to 16 are just an example, and state index and state information can be mapped in various ways. Also, mapping of state index and state information can be carried out in the same way for all of CCs.

TABLE 13

| State index | Information (codeword0/codeword1) |
|---|---|
| 0 | ACK/ACK |
| 1 | NACK/ACK |
| 2 | NACK/NACK |
| 3 | ACK/NACK |
| 4 | DTX |

TABLE 14

| State index | Information (codeword0/codeword1) |
|---|---|
| 0 | DTX |
| 1 | ACK/ACK |
| 2 | NACK/ACK |
| 3 | NACK/NACK |
| 4 | ACK/NACK |

TABLE 15

| State index | Information (codeword0/codeword1) |
|---|---|
| 0 | ACK/ACK |
| 1 | NACK/ACK |
| 2 | DTX |
| 3 | ACK/NACK |
| 4 | NACK/NACK |

TABLE 16

| State index | Information (codeword0/codeword1) |
|---|---|
| 0 | DTX |
| 1 | ACK/NACK |
| 2 | NACK/NACK |
| 3 | NACK/ACK |
| 4 | ACK/ACK |

Also, state index and state information can be mapped differently for each CC. As mapping is applied differently for each CC, randomization can be further facilitated for generation of synthesized state information by combining state information among CCs. Tables 17 and 18 are one example where state index and state information are mapped differently for each CC. Table 17 corresponds to the case where mapping of state index and state information is carried out by circular shift for each DL CC. Table 18 corresponds to the case where mapping of state index and state information is mirrored. For example, state information mapped respectively to state indices 0 to 4 at DL CC #0 is mapped to state indices 4 to 0 for DL CC #1.

TABLE 17

| State index | Information for CC #0 (codeword0/codeword1) | Information for CC #1 (codeword0/codeword1) |
|---|---|---|
| 0 | ACK/ACK | DTX |
| 1 | NACK/ACK | ACK/ACK |
| 2 | NACK/NACK | NACK/ACK |
| 3 | ACK/NACK | NACK/NACK |
| 4 | DTX | ACK/NACK |

TABLE 18

| State index | Information for CC #0 (codeword0/codeword1) | Information for CC #1 (codeword0/codeword1) |
|---|---|---|
| 0 | ACK/ACK | DTX |
| 1 | NACK/ACK | ACK/NACK |
| 2 | NACK/NACK | NACK/NACK |
| 3 | ACK/NACK | NACK/ACK |
| 4 | DTX | ACK/ACK |

At this time, when a UE detects a DTX state, the concept of a downlink assignment index (DAI) used in the LTE rel-8 can be applied. In the LTE rel-8, DAI can specify the accumulated number of PDSCHs assigned and PDCCHs mapped. The DAI may be transmitted through a PDCCH. In other words, to detect the DTX state, a UE can count DL CCs which are actually being transmitted by employing the concept of DAI. For example, if a base station transmits downlink data through PDSCHs of DL CC #0, DL CC #1, and DL CC #2, 0, 1, and 2 may be assigned to the respective DAI values within PDCCHs for PDSCH transmission of DL CC #0, DL CC #1, and DL CC #2. Since it can be known through the DAI whether a UE has failed in decoding PDCCH of DL CC #2, occurrence of the DTX state in the corresponding DL CC can be detected. The total number of DL CCs transmitted can be known through the DAI. At this time, the DAI value may be set to 3 for each DL CC.

Now, it is assumed that state index and state information are mapped according to Table 13. If it is assumed that downlink data are transmitted through PDSCH for all of five DL CCs, UL CC #0 must transmit state information for the five DL CCs. It is assumed that a UE provides feedback for each DL CC as follows. The UE provides ACK/NACK as state information for DL CC #0. Accordingly, state index is 3 and S(0)=3. The UE provides ACK/ACK as state information for DL CC #1. Therefore, state index is 0 and S(1)=0. The UE provides DTX as state information for DL CC #2. Then, state index is 4 and S(2)=4. The UE provides NACK/NACK as state information for DL CC #3. Accordingly, state index is 2 and S(3)=2. And the UE provides NACK/ACK as state information for DL CC #4. Therefore, state index is 1 and S(4)=1. In the present embodiment, since M=M(n), n=0, . . . , N−1, according to Equation 6, synthesized state information can be calculated as shown in Equation 11.

$$S_{total} = S(0) + S(1) \cdot M^1 + S(2) + S(3) \cdot M^3 + S(4) \cdot M^4 \quad <\text{Equation 11}>$$
$$= 3 + 0 \cdot 5^1 + 4 \cdot 5^2 + 2 \cdot 5^3 + 1 \cdot 5^4$$
$$= 978$$

Meanwhile, the length of a binary stream is $L = \lceil \log_2 (5^5) \rceil = 12$. Equation 12 shows a binary stream $[b_0 \ldots b_{11}]$ calculated by using the first equation of Equation 7.

$$[b_0 \ldots b_{11}] = [0\ 1\ 0\ 0\ 1\ 0\ 1\ 1\ 1\ 1\ 0\ 0] \quad <\text{Equation 12}>$$

A UE performs channel coding for the binary stream and carries out modulation by applying a modulation scheme such as QPSK and transmits the modulated binary stream to a base station. The base station receives and demodulates the binary stream, and performs channel coding by using an LLR value. If it is assumed that no error bit is found after the channel decoding, the received bit can be expressed as shown in Equation 13. Since the binary stream has no error bits, Equation 13 gives the same binary stream as expressed by Eq. 12.

$$[b'_0 \ldots b'_{11}] = [0\ 1\ 0\ 0\ 1\ 0\ 1\ 1\ 1\ 1\ 0\ 0] \quad <\text{Equation 13}>$$

If a transmitter, namely, a UE has performed interleaving, de-interleaving may be carried out. If the transmitter has performed interleaving after channel coding, a receiver may perform de-interleaving before channel decoding.

If a received binary stream of Equation 13 is decoded into synthesized state information by Equation 8, the decoding result may be expressed by Equation 14 as follows.

$$S'_{total} = b'_0 + \ldots + b'_{L-1} \cdot 2^{L-1} \quad <\text{Equation 14}>$$
$$= 0 + 1 \cdot 2^1 + 0 \cdot 2^2 + 0 \cdot 2^3 + 1 \cdot 2^4 +$$
$$0 \cdot 2^5 + 1 \cdot 2^6 + 1 \cdot 2^7 + 1 \cdot 2^8 +$$
$$1 \cdot 2^9 + 0 \cdot 2^{10} + 0 \cdot 2^{11}$$
$$= 978$$

If the synthesized state information $S_{total}'$ of Equation 14 is sought by using Equation 10, state information for each DL CC can be detected. In other words, since state information for DL CC #0 is S'(0)=3, ACK/NACK state is detected. Since state information for DL CC #1 is S'(1)=0, ACK/ACK state is detected. Since state information for DL CC #2 is S'(2)=4, DTX state is detected. Since state information for DL CC #3 is S'(3)=2, NACK/NACK state is detected. Since state information for DL CC #4 is S'(4)=1, NACK/ACK state is detected.

In what follows, described will be an example of a method for encoding uplink control information for the case where each DL CC transmits one or two codewords in a carrier aggregation system comprised of five DL CCs.

In providing state information for a DL CC through which one codeword is transmitted, state index and state information can be mapped as shown in Table 19. The number of state information required when a codeword transmitted is 1 reduces from 5 to 3. Mapping between state index and state information is not limited to the mapping relationship shown in Table 19.

TABLE 19

| State index | Information (codeword0 only) |
|---|---|
| 0 | ACK |
| 1 | NAK |
| 2 | DTX |

In the present embodiment, it is assumed that mapping between state index and state information for a DL CC through which two codewords are transmitted is performed according to Table 13 while mapping between state index and state information for a DL CC through which one codeword is transmitted is performed according to Table 19. In other words, the number of state information varies according to the number of codewords transmitted through each DL CC. The above situation may be regarded that state reduction is applied. For example, if DL CC #0 and DL CC #1 transmit two codewords and one codeword, respectively, the number of state information for DL CC #0 is 5 and the number of state information for DL CC #1 is 3. Therefore, a total of 15 pieces of state information (namely, 4 bits) can be generated. The number of codewords transmitted through DL CC can be determined by a rank determined according to a transmission mode. Table 20 illustrates one example of a transmission mode defined by the LTE rel-9.

TABLE 20

| transmission mode | Notes |
|---|---|
| 1 | Transmission from a single eNB antenna port |
| 2 | Transmit diversity |
| 3 | Open-loop spatial multiplexing |
| 4 | Closed-loop spatial multiplexing |
| 5 | Multi-user MIMO |
| 6 | Closed-loop rank-1 precoding |
| 7 | transmission using UE-specific reference signal |
| 8 | Dual-layer beamforming |

With reference to Table 20, two codewords can be transmitted when the transmission mode is 3, 4, 5, or 8, and the number of ranks is two or more. For the remaining transmission modes, only one codeword can be transmitted. At this time, the rank may or may not be the same as the number of layers.

If it is assumed that downlink data are transmitted through PDSCH for all of the five DL CCs, UL CC #0 must transmit all the state information for bout the five DL CCs. It is assumed that DL CC #0, #2, and #3 transmit two codewords while DL CC #1 and #4 transmit one codeword. A UE is assumed to provide feedback for each DL CC as follows. The terminal provides NACK/NACK as state information for DL CC #0. Accordingly, state index is 2 and S(0)=2 and M(0)=5. The UE provides NACK as state information for DL CC #1. Accordingly, state index is 1 and S(1)=1 and M(1)=3. The UE provides DTX as state information for DL CC #2. Accordingly, state index is 4 and S(2)=4 and M(2)=5. The UE provides ACK/NACK as state information for DL CC #3. Accordingly, state index is 3 and S(3)=3 and M(3)=5. And the UE provides DTX as state information for DL CC #4. Accordingly, state index is 2 and S(4)=2 and M(4)=3.

Synthesized state information $S_{total}$ according to Equation 5 can be calculated as shown in Equation 15.

$$K_4 = 0 \qquad \text{<Equation 15>}$$
$$K_3 = S(4) + K_4 \cdot M(4) = 2 + 0 \cdot 3 = 2$$
$$K_2 = S(3) + K_3 \cdot M(3) = 3 + 2 \cdot 5 = 13$$
$$K_1 = S(2) + K_2 \cdot M(2) = 4 + 13 \cdot 5 = 69$$
$$K_0 = S(1) + K_1 \cdot M(1) = 1 + 69 \cdot 3 = 207$$
$$S_{total} = S(0) + K_0 \cdot M(0)$$
$$= 2 + 207 \cdot 5$$
$$= 1037$$

Meanwhile, the length of a binary stream is $$L = \left\lceil \log_2\left(\prod_{i=0}^{N-1} M(i)\right) \right\rceil = \lceil \log_2(5 \cdot 3 \cdot 5 \cdot 5 \cdot 3) \rceil = \lceil \log_2(1125) \rceil = 11.$$

If the length above is compared with that of a case where all of five DL CCs transmit two codewords, it can be known that the length of the binary stream has been reduced by 1 bit. Also, since the binary stream undergoes channel coding and eventually encoding information bits of the same size are generated, an advantageous effect of reducing a code rate (CR) is obtained. Therefore, false alarm rate can be further reduced.

If the binary stream [$b_0 \ldots b_{10}$] is calculated by using the first equation of Equation 7, the result can be expressed as shown in Equation 16.

$$[b_0 \ldots b_{10}] = [1\ 0\ 1\ 1\ 0\ 0\ 0\ 0\ 0\ 0\ 1] \qquad \text{<Equation 16>}$$

A UE applies channel coding to the binary stream and modulates the binary stream by applying a modulation scheme such as QPSK and transmits the binary stream to a base station. The base station receives and demodulates the binary stream and performs channel decoding by using LLR value. If no error bit is found after channel decoding, the received bits can be expressed as shown in Equation 17. Since no error bit is found, Equation 17 provides the same binary stream of Equation 16.

$$[b'_0 \ldots b'_{10}] = [1\ 0\ 1\ 1\ 0\ 0\ 0\ 0\ 0\ 0\ 1] \qquad \text{<Equation 17>}$$

If a received binary stream of Equation 17 is decoded into synthesized state information according to Equation 8, the result is expressed as shown in Equation 18.

$$S'_{total} = b'_0 + \ldots + b'_{L-1} \cdot 2^{L-1} \qquad \text{<Equation 18>}$$
$$= 1 + 0 \cdot 2^1 + 1 \cdot 2^2 + 1 \cdot 2^3 + 0 \cdot 2^4 + 0 \cdot 2^5 +$$
$$0 \cdot 2^6 + 0 \cdot 2^7 + 0 \cdot 2^8 + 0 \cdot 2^9 + 1 \cdot 2^{10}$$
$$= 1037$$

If synthesized state information $S_{total}'$ of Equation 18 is calculated according to Equation 9, state information for each DL CC can be detected. In other words, since state information for DL CC #0 is S'(0)=2, NACK/NACK state is detected. Since state information for DL CC #1 is S'(1)=1, NACK state is detected. Since state information for DL CC #2 is S'(2)=4, DTX state is detected. Since state information for DL CC #3 is S'(3)=3, ACK/NACK state is detected. Since state information for DL CC #4 is S'(4)=2, DTX state is detected.

In the case where each DL CC transmits one or two codewords in a carrier aggregation system comprised of 5 DL CCs, state reduction may not be applied for encoding feedback information. In other words, the number of state information for DL CC transmitting one codeword may be 5, which is the same number of state information for DL CC transmitting two codewords. Table 21 is one example of mapping state index and state information when DL CC transmits one codeword.

TABLE 21

| State index | Information (codeword0 only) -> Tx side | Information (codeword0 only) -> Rx side (Method 0) | Information (codeword0 only) -> Rx side (Method 1) |
|---|---|---|---|
| 0 | ACK | ACK | ACK |
| 1 | Not Assigned | ACK | Not Assigned |
| 2 | NACK | NACK | NAK |
| 3 | Not Assigned | NACK | Not Assigned |
| 4 | DTX | DTX | DTX |

With reference to Table 21, since the Tx side encoding state information does not require five state indices, it maps ACK state, NACK state, and DTX state to state index 0, 2, and 4, respectively, and state index 1 and 3 may not be used. The Rx side decoding state information may simply follow the mapping relationship at the Tx side (method 1 of Table 21), or state index 1 and 3 may be used for representing ACK and NACK state, respectively. The aforementioned operation of the Rx side implicitly increases hamming distance, thereby reducing false alarm rate. Since the present embodiment assumes that no error bit has been found after carrying out channel decoding, there is no difference between method 0 and 1. Mapping between state index and state information for DL CC transmitting one codeword is not limited to the mapping relationship shown in Table 21. In the present embodiment, it is assumed that mapping of state index and state information for DL CC transmitting two codewords follows the mapping relationship of Table 13 while mapping of state index and state information for DL CC transmitting one codeword follows the mapping relationship of Table 21.

If all of the five DL CCs transmit downlink data through PDSCH, UL CC #0 must transmit all the state information for the five DL CCs. Now, it is assumed that DL CC #0, #2, and #3 transmit two codewords while DL CC #1 and #4 transmit one codeword. A UE is assumed to provide feedback for each DL CC as follows. The UE provides NACK/NACK as state information for DL CC #0. Accordingly, state index is 2 and S(0)=2 and M(0)=5. The UE provides NACK as state information for DL CC #1. Accordingly, state index is 1 and S(1)=1 and M(1)=3. The UE provides DTX as state information for DL CC #2. Accordingly, state index is 4 and S(2)=4 and M(2)=5. The UE provides ACK/NACK as state information for DL CC #3. Accordingly, state index is 3 and S(3)=3 and M(3)=5. And the UE provides DTX as state information for DL CC #4. Accordingly, state index is 2 and S(4)=2 and M(4)=3.

Synthesized state information $S_{total}$ according to Equation 5 can be calculated as shown in Equation 19.

$$K_4 = 0$$
$$K_3 = S(4) + K_4 \cdot M(4) = 4 + 0 \cdot 5 = 4$$
$$K_2 = S(3) + K_3 \cdot M(3) = 3 + 4 \cdot 5 = 23$$
$$K_1 = S(2) + K_2 \cdot M(2) = 4 + 23 \cdot 5 = 119$$
$$K_0 = S(1) + K_1 \cdot M(1) = 2 + 119 \cdot 5 = 597$$
$$S_{total} = S(0) + K_0 \cdot M(0)$$
$$= 2 + 597 \cdot 5$$
$$= 2987$$

<Equation 19>

Meanwhile, the length of a binary stream is $$L = \left\lceil \log_2\left(\prod_{i=0}^{N-1} M(i)\right) \right\rceil = \lceil \log_2(5 \cdot 5 \cdot 5 \cdot 5 \cdot 5) \rceil = \lceil \log_2(3125) \rceil = 12.$$

If the binary stream $[b_0 \ldots b_{10}]$ is calculated by using the first equation of Equation 7, the result can be expressed as shown in Equation 20.

$$[b_0 \ldots b_{11}] = [1\ 1\ 0\ 1\ 0\ 1\ 0\ 1\ 1\ 1\ 0\ 1] \qquad \text{<Equation 20>}$$

A UE applies channel coding to the binary stream and modulates the binary stream by applying a modulation scheme such as QPSK and transmits the binary stream to a base station. The base station receives and demodulates the binary stream and performs channel decoding by using LLR value. If no error bit is found after channel decoding, the received bits can be expressed as shown in Equation 21. Since no error bit is found, Equation 21 provides the same binary stream of Equation 20.

$$[b'_0 \ldots b'_{11}] = [1\ 1\ 0\ 1\ 0\ 1\ 0\ 1\ 1\ 1\ 0\ 1] \qquad \text{<Equation 21>}$$

If a received binary stream of Equation 21 is decoded into synthesized state information according to Equation 8, the result is expressed as shown in Equation 22.

$$S'_{total} = b'_0 + \ldots + b'_{L-1} \cdot 2^{L-1}$$
$$= 1 + 1 \cdot 2^1 + 0 \cdot 2^2 + 1 \cdot 2^3 + 0 \cdot 2^4 + 1 \cdot 2^5 +$$
$$0 \cdot 2^6 + 1 \cdot 2^7 + 1 \cdot 2^8 + 1 \cdot 2^9 + 0 \cdot 2^{10} + 1 \cdot 2^{11}$$
$$= 2987$$

<Equation 22>

If synthesized state information $S_{total}'$ of Equation 22 is calculated according to Equation 9, state information for each DL CC can be detected. In other words, since state information for DL CC #0 is S'(0)=2, NACK/NACK state is detected. Since state information for DL CC #1 is S'(1)=1, NACK state is detected. Since state information for f DL CC #2 is S'(2)=4, DTX state is detected. Since state information for DL CC #3 is S'(3)=3, ACK/NACK state is detected. Since state information for DL CC #4 is S'(4)=2, DTX state is detected.

In what follows, an extended PUCCH format will be described. The ACK/NACK feedback information described above can be transmitted through an extended PUCCH format. The extended PUCCH format can substitute for PUCCH format 1/1a/1b or 2/2a/2b of the LTE Rel-8 in a carrier aggregation system for transmission of a lot more payload. As done for the ACK/NACK feedback information, payload also increases for the case where CQI/PMI RI is transmitted for each component carrier. Therefore, a new PUCCH format is required.

Figure 24:
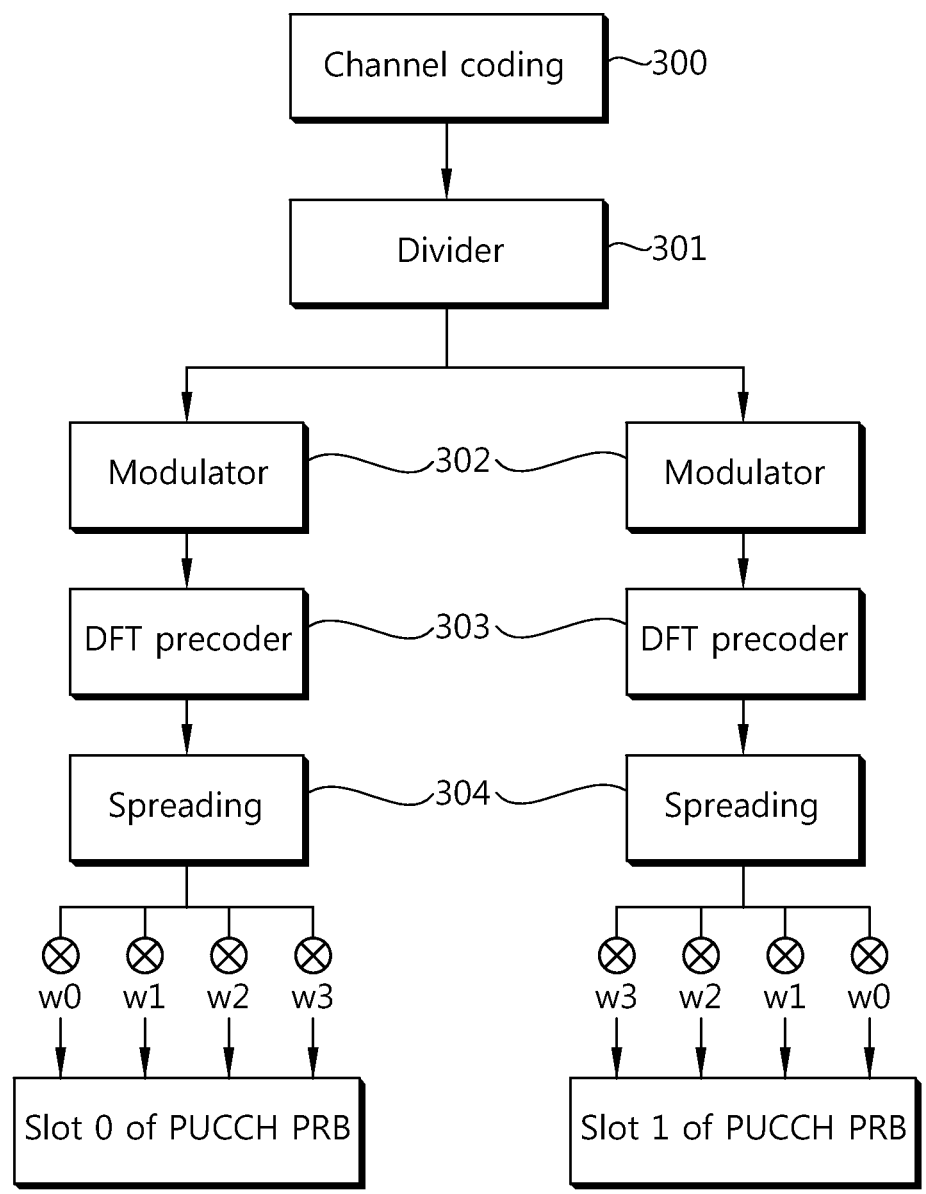
FIG. 24 is an example of an extended PUCCH format.

FIG. 24 is an example of an extended PUCCH format. The extended PUCCH format of FIG. 24 may be a PUCCH format to which a DFT-s OFDM transmission scheme is applied. Although the extended PUCCH format of FIG. 24 is not limited to a specific PUCCH format, in order to facilitate explanation, the following description will be based on a normal CP structure of a PUCCH format 1 for carrying ACK/NACK. The extended PUCCH format is also applicable to PUCCH formats 2/2a/2b for UCI transmission such as CQI/PMI/RI. That is, the extended PUCCH format is applicable to any control information. For example, it is possible to use the extended PUCCH format proposed to support a 13 (or higher)-bit payload in the PUCCH format 2 supporting up to a 13-bit payload.

Referring to FIG. 24, channel coding is performed on an information bit (e.g., ACK/NACK, etc.) for each component carrier (step 300). The channel coding may be any one of various types of coding schemes, such as simple repetition, simplex coding, RM coding, punctured RM coding, tail-biting convolutional coding (TBCC), low density parity check (LDPC) coding, or turbo coding. An encoding information bit generated as a result of channel coding can be rate-matched by considering a modulation symbol order to be applied and a resource to be mapped. For inter-cell interface (ICI) randomization for the generated encoding information bit, cell-specific scrambling using a scrambling code corresponding to a cell identifier (ID) or UE-specific scrambling using a scrambling code corresponding to a UE ID (e.g., a radio network temporary identifier (RNTI)) can be used.

The encoding information bit is distributed to each slot via a divider (step 301). The encoding information bit can be distributed to two slots in various manners. For example, a first part of the encoding information bit can be distributed to a first slot, and a last part of the encoding information bit can be distributed to a second slot. Alternatively, by using an interleaving scheme, an even encoding information bit can be distributed to the first slot, and an odd encoding information bit can be distributed to the second slot. The encoding information bit distributed to each slot is modulated via a modulator (step 302). A QPSK symbol can be generated by modulating the encoding information bit. Meanwhile, the modulator and the divider may be placed in a reverse order.

Discrete Fourier transform (DFT) precoding is performed on QPSK symbols in each slot to generate a single carrier waveform in each slot (step 303). In addition to the DFT precoding, an operation of Walsh precoding or the like corresponding thereto can be performed. However, it is assumed hereinafter that the DFT precoding is performed unless specified otherwise.

Time spreading is performed with an SC-FDMA symbol level on QPSK symbols for which DFT precoding is performed, by using an orthogonal code having an index m which is predetermined or determined through dynamic signaling or radio resource control (RRC) signaling (step 304). The orthogonal code of the index m can be expressed by $w_m=[w_0\ w_1\ w_2\ w_3]$ if a spreading factor (SF) is 4. If the orthogonal code is a Walsh code and the SF is 4, it can be expressed by $w_0[1\ 1\ 1\ 1]$, $w_1=[1\ -1\ 1\ -1]$, $w_2=[1\ 1\ -1\ -1]$, $w_3=[1\ -1\ -1\ 1]$. If the orthogonal code is a DFT code, it can be expressed by $w_m=[w_0\ w_1\ \ldots\ w_{k-1}]$, where $w_k=\exp(j2\pi km/SF)$. In addition, another code other than the Walsh code and the DFT code may be used as the orthogonal code. The SF implies a factor by which data is spread, and can be related to the number of UEs to be multiplexed or the number of antennas. The SF may vary depending on a system, and may be predetermined or may be reported to the UE through DCI or RRC signaling. In addition, the orthogonal code applied with the SC-FDMA symbol level can be applied by changing an index in a slot level. That is, the orthogonal code can be hopped in the slot level.

A signal generated as described above is mapped to a subcarrier in a PRB, is then converted into a signal of a time domain by inverse fast Fourier transform (IFFT), and is transmitted via a radio frequency (RF) unit by attaching a cyclic prefix (CP).

Figure 25:
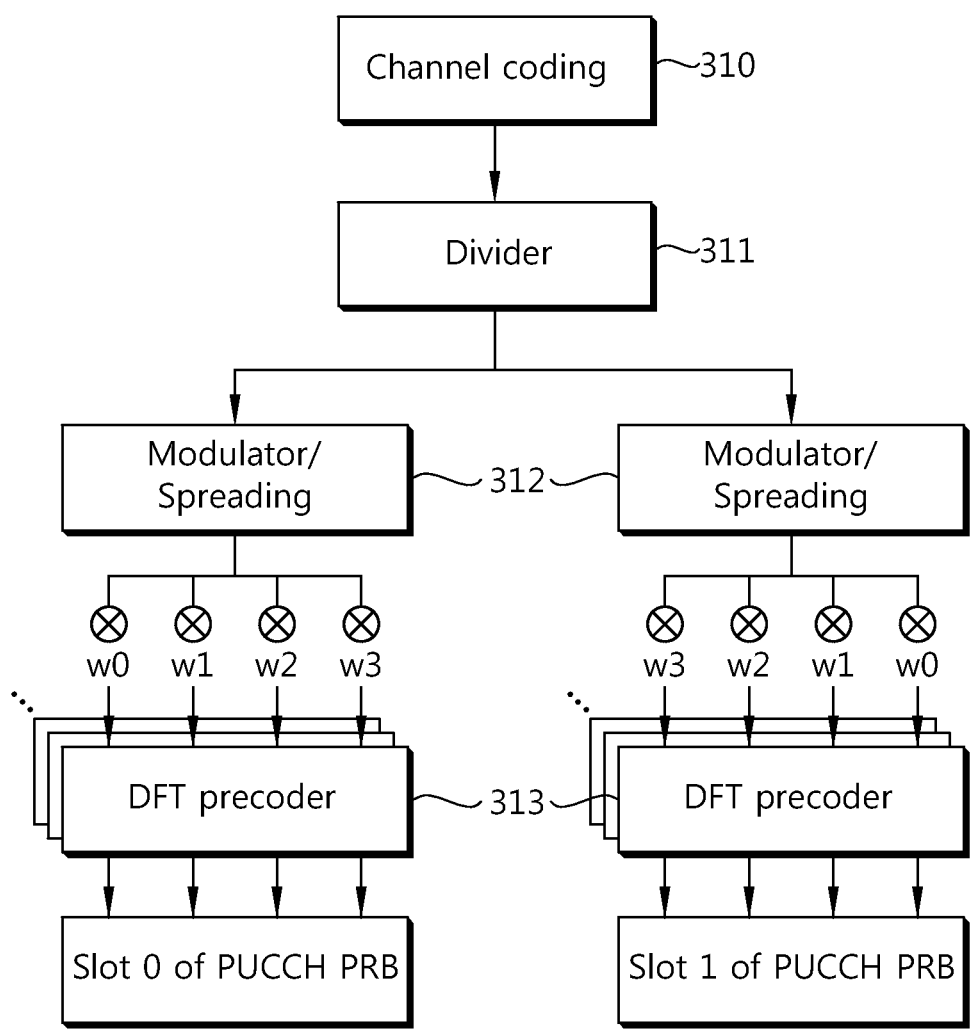
FIG. 25 is another example of an extended PUCCH format.

FIG. 25 is another example of an extended PUCCH format. Referring to FIG. 25, channel coding is performed on an information bit such as ACK/NACK for each component carrier (step 310), and the encoding information bit is distributed to each slot via a divider (step 311). The encoding information bit distributed to each slot is modulated via a modulator, and a QPSK symbol generated as a result of modulation is time-spread by an orthogonal code of an index m (step 312). If SF=4, the orthogonal code of the index m can be expressed by $w_m=[w_0\ w_1\ w_2\ w_3]$. DFT precoding is performed with an SC-FDMA level on time-spread QPSK symbols (step 313), and a signal generated in this manner is mapped to a subcarrier in a PRB. That is, the extended PUCCH format of FIG. 25 is different from the extended PUCCH format of FIG. 24 in a sense that time spreading is performed before DFT precoding.

Figure 26:
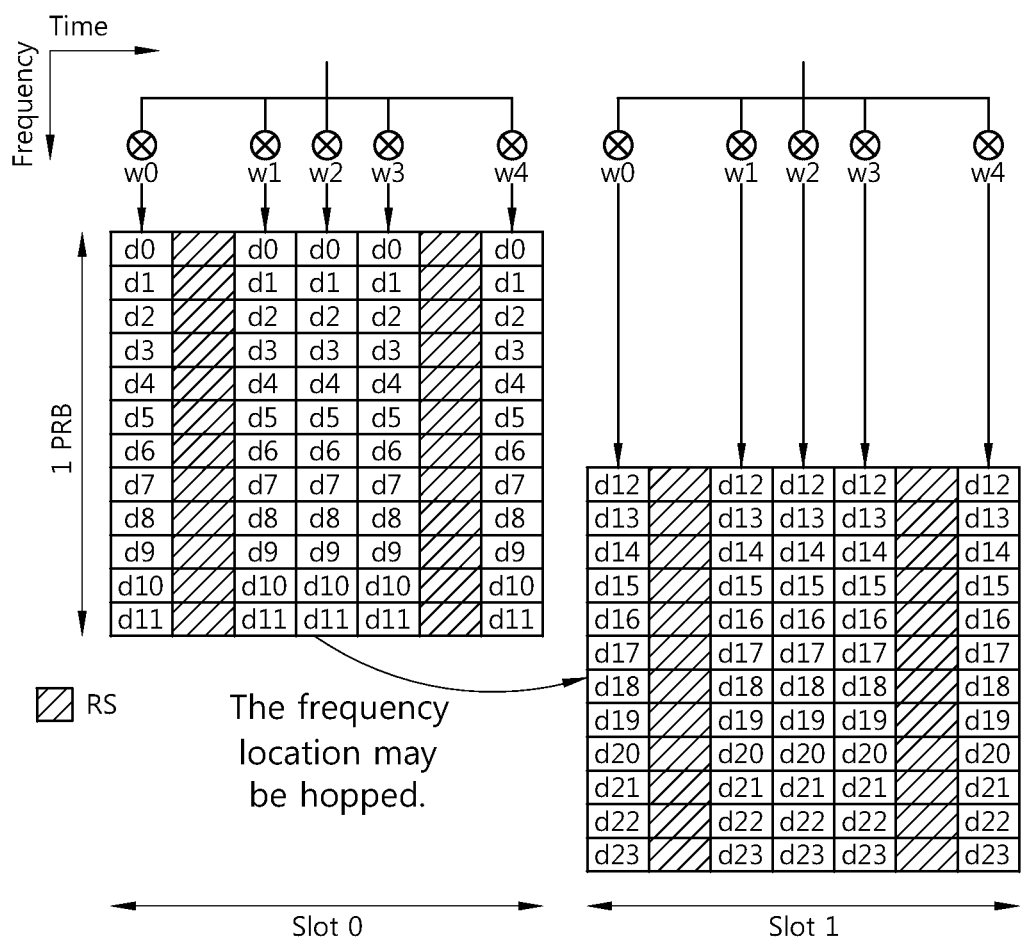
FIG. 26 shows an example of time spreading for a modulated QPSK symbol with an extended PUCCH format.

FIG. 26 shows an example of time spreading for a modulated QPSK symbol with an extended PUCCH format. A case where a QPSK symbol is time-spread in a normal CP is shown in FIG. 26. Referring to FIG. 26, the QPSK symbol is time-spread across 5 SC-FDMA symbols in one slot. A reference signal is mapped to $2^{nd}$ and $6^{th}$ SC-FDMA symbols in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m=[w_0\ w_1\ w_2\ w_3\ w_4]$. In addition, the orthogonal code can be hopped in a slot level.

Figure 27:
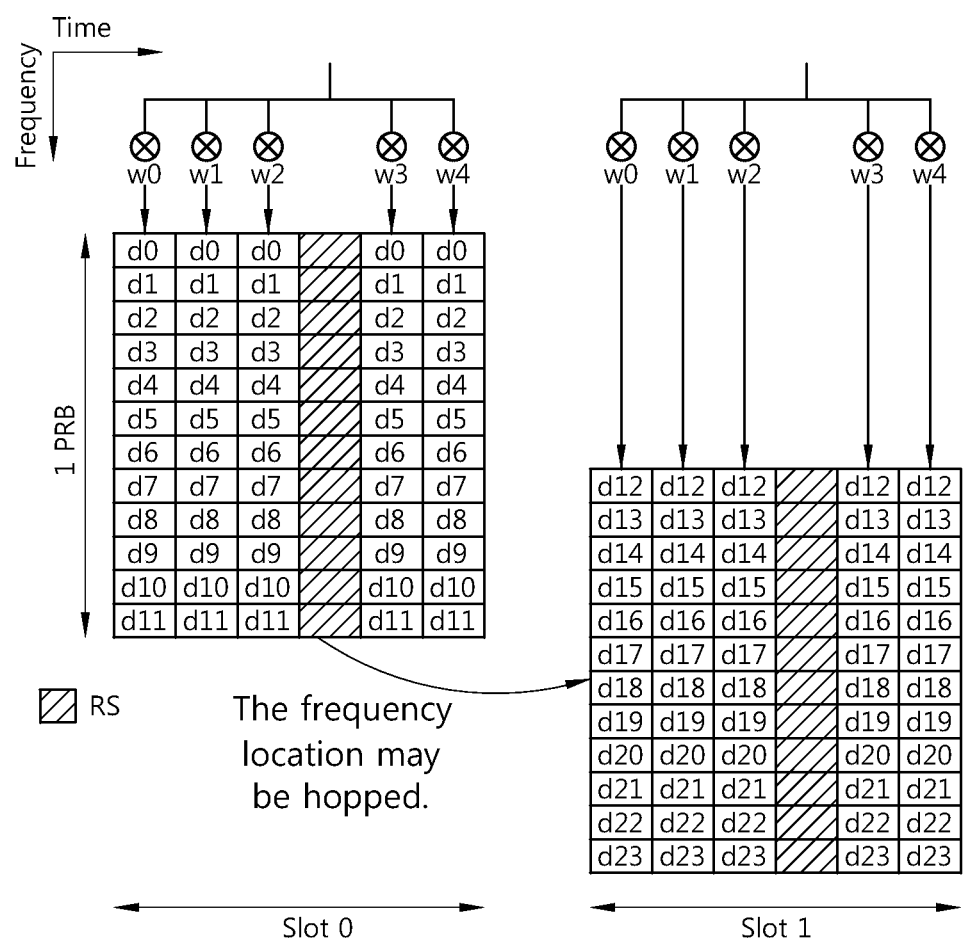
FIG. 27 is another example of time spreading for a modulated QPSK symbol with an extended PUCCH format.

FIG. 27 is another example of time spreading for a modulated QPSK symbol with an extended PUCCH format. A case where a QPSK symbol is time-spread in an extended CP is shown in FIG. 27. Referring to FIG. 27, the QPSK symbol is time-spread across 5 SC-FDMA symbols in one slot. A reference signal is mapped to a $4^{th}$ SC-FDMA symbol in each slot. This is the same position to which a reference signal is mapped in PUCCH formats 2/2a/2b in LTE rel-8. When the QPSK symbol is time-spread, an orthogonal code having an index m which is predetermined or determined through dynamic signaling or RRC signaling can be used. If SF=5, the orthogonal code having the index m can be expressed by $w_m=[w_0\ w_1\ w_2\ w_3\ w_4]$. In addition, the orthogonal code can be hopped in a slot level.

Figure 28:
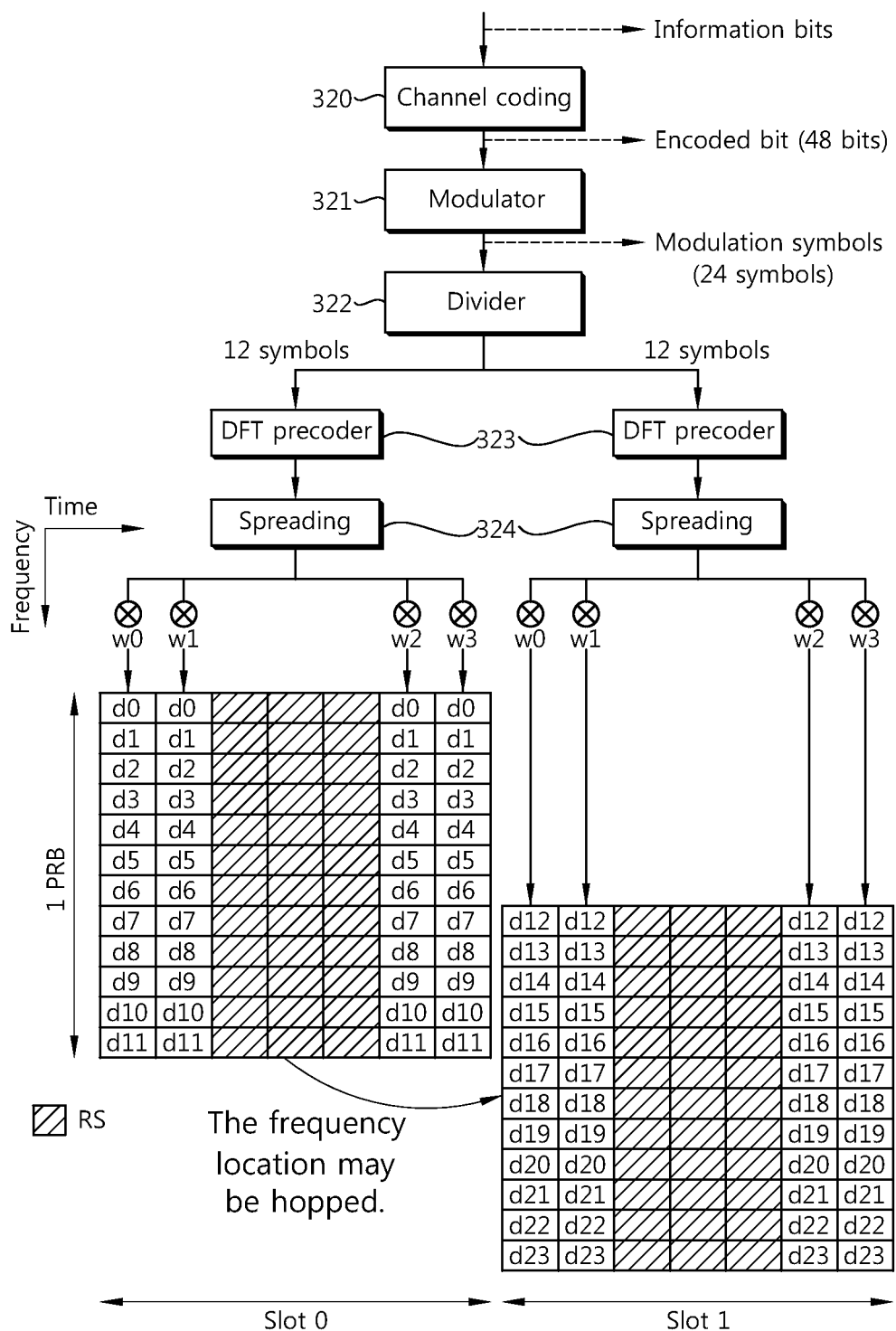
FIG. 28 is another example of an extended PUCCH format.

FIG. 28 is another example of an extended PUCCH format. The extended PUCCH format of FIG. 28 is a case where joint coding is performed on two slots in a subframe. Referring to FIG. 28, channel coding is performed on an information bit such as ACK/NACK for each component carrier (step 320). Since a QPSK modulation scheme is used and mapping is performed on two slots through one PRB consisting of 12 subcarriers in the present embodiment, 48 encoding bits can be generated. The encoding information bit is modulated via a modulator (step 321). Since a QPSK modulation scheme is used in the present embodiment, 24 QPSK symbols are generated. The QPSK symbols are distributed to each slot via a divider (step 322). The QPSK symbols can be distributed to two slots in various manners. DFT precoding is performed on the QPSK symbols distributed to each slot via the divider (step 323). Since 12 QPSK symbols are distributed to each slot in the present embodiment, 12-point DFT precoding is performed. Time spreading is performed with an SC-FDMA symbol level on QPSK symbols for which DFT precoding is performed, by using an orthogonal code having an index m (step 324). The orthogonal code can be hopped in a slot level.

A signal generated as described above is mapped to a subcarrier in a PRB, is then converted into a signal of a time domain by IFFT, and is transmitted via a RF unit by attaching a CP. If SF=4, 12-bit information for carrying ACK/NACK for 5 component carriers can be transmitted with a coding rate of 0.0625(=12/48/4), and 4 UEs can be multiplexed per one PRB.

In applying a method for encoding uplink control information according to the present invention, the number of bits provided as feedback, namely, the size of a codebook may be determined by various ways.

First, the concept of a cell is described. The concept of a cell can be applied for the LTE-A system. A cell is an entity comprised of at least one unit of downlink resources and optionally uplink resources from the point of view of a UE. In other words, one cell certainly includes at least one unit of downlink resources but uplink resources may not be necessarily included. The one unit of downlink resources may correspond to one DL CC. A linkage between carrier frequency of downlink resources and that of uplink resources can be specified by SIB2 transmitted through downlink resources.

Type of a cell can be classified by an allocation method. First, the number of cells allocated for the whole system can be fixed. For example, the number of cells allocated for the whole system may be 8. The whole or part of the cells allocated for the entire system may be allocated by a radio resource control (RRC) signaling of an upper layer. A cell allocated by the RRC signaling is called a configured cell. In other words, a configured cell may indicate the one allocated for use by the system among cells allocated for the entire system. All or part of configured cells may be allocated by a media access control (MAC) signaling. A cell allocated by the MAC signaling may be called an activated cell. The remaining cells among configured cells except for activated cells may be called deactivated cells. The whole or part of activated cells is allocated to a UE by an L1/L2 signaling. A cell allocated by the L1/L2 signaling may be called a scheduled cell. A scheduled cell can receive data through a PDSCH by using downlink resources within the cell and transmit data through a PUSCH by using uplink resources within the cell. Since it was assumed in the above description of a method for uplink control information according to the present invention that a plurality of DL CCs all transmits data, DL CCs involved in this case may all be called scheduled DL CCs.

As described above, when the DAI is transmitted together, the size of a codebook for ACK/NACK feedback can be determined based on the number of scheduled DL CCs and the number of transmitted codewords determined by a transmission mode and rank within a CC. However, if the size of a codebook is determined based on the number of configured DL CCs instead of the number of scheduled DL CCs, the DAI does not have to be transmitted. In other words, the size of a codebook can be determined semi-statically according to the number of configured DL CCs specified by the RRC signaling. Also the size of a codebook can be determined dynamically according to the number of ranks transmitted through a transmission mode and DCI format specified by the RRC signaling. At this time, the number of ranks transmitted through the DCI format may be expressed together with precoding vector information. The above description may be consulted in Section 6.3.4.2.3 of 3GPP TS 36.211 V8.9.0 (2009-12) "Technical Specification Group Radio Access Network; Evolved Universal Terrestrial Radio Access (E-UTRA); Physical Channels and Modulation (Release 8)". Table 22 illustrates a codebook of a precoding matrix when the number of antenna ports is two. With reference to Table 22, 3 bits are used for precoding information to provide feedback of a total of seven states according to the number of layers and codebook index.

TABLE 22

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

Table 23 illustrates a codebook of a precoding matrix when the number of antenna ports is four. With reference to Table 23, 6 bits are used for precoding information to provide feedback of a total of 64 states according to the number of layers and codebook index.

TABLE 23

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Now, a method for determining the size of a codebook according to the number of configured DL CCs, a transmission mode, and the number of ranks will be described with reference to an embodiment. For example, it is assumed that the number of antenna ports is 2 and the total number of configured DL CCs is 4. Also, it is further assumed that DTX state is provided as feedback. If the transmission mode of DL CC #0 is 3 and the number of ranks is 2, a total of 5 states can be provided as feedback. If the transmission mode of DL CC #1 is 4 and the number of ranks is 1, a total of 3 states can be provided as feedback. If the transmission mode of DL CC #2 is 8 and the number of ranks is 2, a total of 5 states can be provided as feedback. If the transmission mode of DL CC #3 is 1 and the number of ranks is 1, a total of 3 states can be provided as feedback. Based on the above, the total number of states provided as feedback is 225 and the size of a codebook can be expressed by 8 bits ($\lceil \log_2(225-1) \rceil$). In the equation for expressing the codebook, '−1' indicates exclusion of the case where all the states are of DTX state.

If the DTX state is not provided explicitly but in a state such as NACK state in the above embodiment, the number of states required for each configured DL CC becomes 4 in the case of transmitting 2 codewords and 2 in the case of 1 codeword. In other words, DL CC #0 can provide feedback of a total of 4 states. DL CC #1 a total of 2 states. DL CC #2 a total of 4 states. DL CC #3 a total of 2 states. Accordingly, the total number of feedback states is 64 and the size of the codebook is expressed by 6 bits ($\lceil \log_2(64-1) \rceil$).

Meanwhile, since a maximum value for the number of ranks is automatically determined according to a transmission mode, the size of a codebook can be determined based on the number of configured DL CCs and the number of codewords according to ranks without taking account of a transmission mode specified by the RRC signaling.

Also, the size of a codebook may be determined based only on the number of DL CCs and a transmission mode. Since the maximum number of codewords that can be transmitted in a transmission mode is determined according to the corresponding transmission mode, the size of a codebook can be determined based on the maximum number of codewords. For example, it is assumed that the total number of DL CCs is 4 and DTX state is provided as feedback. Since a maximum of two codewords can be transmitted when the transmission mode of DL CC #0 is 3 and the number of ranks is 2, a total of five states can be provided as feedback. In the same way, even if the transmission mode of DL CC #1 is 4 and the number of ranks is 1, a total of five states can be provided as feedback when only the transmission mode is taken into account. A total of five states can be provided as feedback when the transmission mode of DL CC #2 is 8 and the number of ranks is 2. A total of three states can be provided as feedback when the transmission mode of DL CC #3 is 1 and the number of ranks is 1. Accordingly, the total number of states provided as feedback is 375 and the size of a codebook can be expressed by 9 bits ($\lceil \log_2(375-1) \rceil$).

If the DTX state is not explicitly provided as feedback in the above embodiment, DL CC #0 can provide a total of 4 states as feedback. DL CC #1 a total of 4 states. DL CC #2 a total of 4 states. DL CC #3 a total of 2 states. Accordingly, the total number of states provided as feedback is 64 and the size of the codebook becomes 7 bits ($\lceil \log_2(128-1) \rceil$).

Also, the size of a codebook may be determined based on the number of activated DL CCs or the number of scheduled DL CCs instead of using the number of configured DL CCs. In other words, the size of a codebook may be determined based on the number of activated DL CCs and the number of codewords or based on the number of scheduled DL CCs and the number of codewords.

Meanwhile, Table 24 is one example of a mapping relationship between transport blocks and codewords. With reference to Table 24, if the swap flag value is 0, the transport block 1 is mapped to the codeword 0 while the transport block 2 is mapped to the codeword 1. If the swap flag value is 1, the transport block 1 is mapped to the codeword 1 while the transport 2 is mapped to the codeword 0.

TABLE 24

| transport block to codeword swap flag value | codeword 0 (enabled) | codeword 1 (enabled) |
| --- | --- | --- |
| 0 | transport block 1 | transport block 2 |
| 1 | transport block 2 | transport block 1 |

Meanwhile, even though a transmission mode allows transmission of two codewords, it is sometimes the case that only one codeword is transmitted irrespective of the transmission mode and the number of ranks. For example, the above case corresponds to the situation where only one transport block of the two transport blocks is allowed to be transmitted as shown in Table 25. The above case applied also to the situation where re-transmission is required only for one codeword or transmission of one codeword is made possible as a single antenna fall-back method is employed. Table 25 is another example of a mapping relationship between transport blocks and codewords.

TABLE 25

| transport block 1 | transport block 2 | codeword 0 (enabled) | codeword 1 (disabled) |
| --- | --- | --- | --- |
| enabled | disabled | transport block 1 | — |
| disabled | enabled | transport block 2 | — |

Meanwhile, the size of a codebook may be changed according to the number of codewords. For convenience of description, it is assumed that the size of a codebook is determined based on configured DL CCs and NACK state and DTX state are expressed together. In other words, ACK state can be mapped to 1 while NACK state and DTX state are mapped to 0.

If it is assumed that four configured DL CCs are employed, according to a transmission mode, the number of codewords transmitted by each configured DL CC becomes 2 for DL CC #0, #1, and #3 while it is 1 for DL CC #2. Also, DL CC #0, #1, and #2 are assumed to be activated DL CCs. At this time, a UE transmits ACK/NACK state only for DL CC which has successfully detected PDCCH and transmits a pre-assigned value when the UE failed to decode PDCCH. At this time, the pre-assigned value may correspond to 0. A codebook may comprised of [a0 a1 b0 b1 c0 d0 d1] or [a0 a1 b0 b1 c0 c1 d0 d1]. a0 and a1 are ACK/NACK bit corresponding to each of a first and a second codeword of DL CC #0. In the same way, b0 and b1 correspond to ACK/NACK bit corresponding to a first and a second codeword of DL CC #1; c0 and c1, DL CC #2; and d0 and 1, DL CC #3. In other words, position of ACK/NACK bit for each DL CC can be pre-determined. A codebook of [a0 a1 b0 b1 c0 d0 d1] indicates that the size of the codebook has been determined based on the number of codewords transmitted by each DL CC while a codebook of [a0 a1 b0 b1 c0 d0 d1] indicates determination of the size of the codebook based on the maximum number of codewords which can be transmitted by each DL CC.

For example, it is assumed that activated DL CCs, DL CC #0, #1, and #2 transmit downlink control signals through a PDCCH and only PDCCHs of DL CC #0 and #2 have been decoded. Also, it is further assumed that all the codewords corresponding to the above setting have been successfully decoded. If a codebook is [a0 a1 b0 b2 c0 c1 d0 d1], a UE may provide [1 1 0 0 1 0 0 0] as feedback. Since DL CC #3 is a deactivated DL CC, ACK/NACK bit corresponding to d0 and d1 is mapped to [0 0]. Also, since DL CC #2 transmits only one codeword, c1, which is ACK/NACK bit for a second codeword of DL CC #2, is also mapped to 0. Similarly, since a base station already knows that DL CC #2 does not have a second codeword, c1 can be deduced from c0 for mapping. For example, if it is assumed that c1 is mapped by repeating c0, a UE can provide [1 1 0 0 1 1 0 0] as feedback. Since the base station already knows that ACK/NACK bit of c1, d0, and d1 has not been scheduled, decoding can be carried out by excluding c1, d0, and d1 at the time of decoding feedback information. Also, if a codebook is [a0 a1 b0 b2 c0 d0 d1], the UE provide [1 1 0 0 1 0 0] as feedback.

Figure 29:
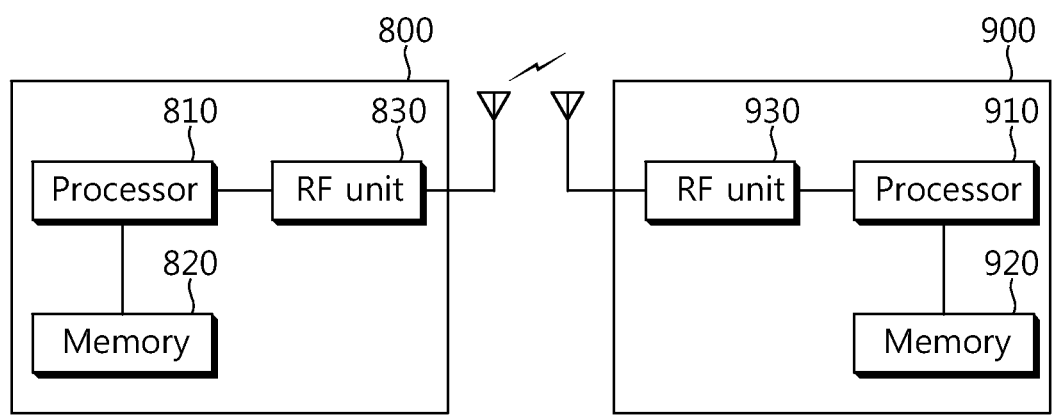
FIG. 29 is a block diagram of a base station and a terminal for which an embodiment of the present invention is implemented.

FIG. 29 is a block diagram of a base station and a terminal for which an embodiment of the present invention is implemented.

A base station 800 comprises a processor 810, memory 820, and a radio frequency (RF) unit 830. The processor 810 implements functions, procedures, and/or method according to the present invention. Layers of wireless interface protocol can be implemented by the processor 810. The memory 820, being connected to the processor 810, stores various kinds of information for activating the processor 810. The RF unit 830, being connected to the processor 810, transmits and/or receives wireless signals.

A UE 900 comprises a processor 910, memory 920, and an RF unit 930. The processor 910 implements functions, procedures, and/or method according to the present invention. Layers of wireless interface protocol can be implemented by the processor 910. The processor 910 performs channel coding on information bits of the UCI to generate encoding information bits, modulates the generated encoding information bits to generate complex modulation symbols, and block-wise spreads the complex modulation symbols to multiple SC-FDMA symbols on the basis of an orthogonal sequence. The memory 920, being connected to the processor 910, stores various kinds of information for activating the processor 910. The RF unit 930, being connected to the processor 910, transmits and/or receives wireless signals and transmits the spread complex modulation symbols to the base station.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting uplink control information (UCI) by a user equipment on a physical uplink control channel (PUCCH) in a wireless communication system, the method comprising:
    performing channel coding on information bits of the UCI to generate encoded information bits, wherein the information bits of the UCI include hybrid automatic repeat request (HARQ)-ACK(acknowledgement) information bits for serving cells, and wherein a number of information bits of the UCI is determined based on a number of the serving cells and a number of codewords for each of the serving cells, which is based on a transmission mode of each of the serving cells;
    modulating the encoded information bits to generate complex modulation symbols;
    block-wise spreading the complex modulation symbols on the basis of an orthogonal sequence; and
    transmitting the spread complex modulation symbols to a base station.

2. The method of claim 1, wherein if the transmission mode of each of the serving cells is a single codeword transmission mode, a number of the HARQ-ACK information bits for the corresponding serving cell is 1 bit.

3. The method of claim 2, wherein the single codeword transmission mode is one of transmission modes 1, 2, 5, 6, and 7.

4. The method of claim 1, wherein one of the HARQ-ACK information bits for each of the serving cells corresponds to an HARQ-ACK information bit for a first codeword, and
    wherein the remaining bit of the HARQ-ACK information bits for each of the serving cells corresponds to an HARQ-ACK information bit for a second codeword.

5. The method of claim 1, wherein generating the encoded information bits comprises:
    obtaining a state information bit indicating state information of each of a plurality of configured cells;
    generating a synthesized state information bit stream by combining the state information bit of each of the plurality of configured cells; and
    encoding the synthesized state information bit stream into a binary stream.

6. The method of claim 5, wherein a length of the binary stream is determined based on a number of the plurality of configured cells given by a radio resource control (RRC) signaling.

7. The method of claim 5, wherein state information of each of the plurality of configured cells is mapped to a pre-determined state index.

8. The method of claim 5, wherein a position of state information bit of each of the plurality of configured cells in the binary stream is pre-determined.

9. The method of claim 5, wherein state information bit of the configured cell which fails to decode a physical downlink control channel (PDCCH) is set to 0.

10. The method of claim 1, wherein if the transmission mode of each of the serving cells is not a single codeword transmission mode, a number of the HARQ-ACK information bits for the corresponding serving cell is 2 bits.

11. The method of claim 1, wherein the HARQ-ACK information bit for a corresponding serving cell which fails to receive a physical downlink control channel (PDCCH) corresponds to a non-acknowledgment (NACK).

12. A user equipment in a wireless communication system, the user equipment comprising:
    a radio frequency (RF) unit for transmitting or receiving a radio signal; and
    a processor connected to the RF unit, and configured for:
    performing channel coding on information bits of the UCI to generate encoded information bits, wherein the information bits of the UCI include hybrid automatic repeat request (HARQ)-ACK(acknowledgement) information bits for serving cells, and wherein a number of information bits of the UCI is determined based on a number of the serving cells and a number of codewords for each of the serving cells, which is based on a transmission mode of each of the serving cells;
    modulating the encoded information bits to generate complex modulation symbols; and
    block-wise spreading the complex modulation symbols on the basis of an orthogonal sequence.

13. The user equipment of claim 12, wherein if the transmission mode of each of the serving cells is a single codeword transmission mode, the number of the HARQ-ACK information bits for the corresponding serving cell is 1 bit.

14. The user equipment of claim 12, wherein one of the HARQ-ACK information bits for each of the serving cells corresponds to an HARQ-ACK information bit for a first codeword, and
    wherein the remaining bit of the HARQ-ACK information bits for each of the serving cells corresponds to an HARQ-ACK information bit for a second codeword.

15. The method of claim 12, wherein the HARQ-ACK information bit for a corresponding serving cell which fails to receive a physical downlink control channel (PDCCH) corresponds to a non-acknowledgment (NACK).

* * * * *